(12) United States Patent
Higgins et al.

(10) Patent No.: US 10,693,165 B1
(45) Date of Patent: Jun. 23, 2020

(54) ENVIRONMENTAL SENSOR ARRAY FOR FUEL CELL AIR FILTRATION SYSTEMS

(71) Applicant: University of Hawai'i, Honolulu, HI (US)

(72) Inventors: Scott Robert Higgins, Honolulu, HI (US); James Michel Ewan, Cypress, TX (US)

(73) Assignee: University of Hawai'i, Honolulu, HI (US)

( * ) Notice: Subject to any disclaimer, the term of this patent is extended or adjusted under 35 U.S.C. 154(b) by 414 days.

(21) Appl. No.: 15/269,390

(22) Filed: Sep. 19, 2016

Related U.S. Application Data

(60) Provisional application No. 62/220,520, filed on Sep. 18, 2015.

(51) Int. Cl.
*H01M 8/04955* (2016.01)
*H01M 8/04992* (2016.01)

(52) U.S. Cl.
CPC ... *H01M 8/04955* (2013.01); *H01M 8/04992* (2013.01); *H01M 2250/20* (2013.01)

(58) Field of Classification Search
CPC ........... H01M 8/0438; H01M 8/04432; H01M 8/0687; H01M 8/0662; H01M 8/04992; H01M 8/04955; H01M 8/0675
See application file for complete search history.

(56) References Cited

U.S. PATENT DOCUMENTS

| 6,403,243 B1 | 6/2002 | Herdeg et al. |
| 6,969,561 B2 | 11/2005 | de Vaal et al. |
| 7,087,327 B2 * | 8/2006 | Pearson ............ H01M 8/04089 320/101 |

(Continued)

FOREIGN PATENT DOCUMENTS

| KR | 100778480 B1 * | 11/2007 |
| WO | WO-2009025614 A1 | 2/2009 |

OTHER PUBLICATIONS

KR 100778480 Machine Translation.*
(Continued)

*Primary Examiner* — Amy Cohen Johnson
*Assistant Examiner* — Paul D Baillargeon
(74) *Attorney, Agent, or Firm* — Behmke Innovation Group LLC; James M. Behmke; James J. Wong

(57) ABSTRACT

In one embodiment, an environmental sensor array monitors pre-filter airflow to a fuel cell with an air filter, and senses amounts of filter exposure of air contaminants in the monitored pre-filter airflow. The environmental sensor array may then correlate the sensed amounts of filter exposure over time to a long-term adsorption limit of the air contaminants for the air filter, determining a lifetime usage level of the air filter. Accordingly, the environmental sensor array may provide an indication of the lifetime usage level of the air filter. In another embodiment, the environmental sensor array may also monitor post-filter airflow to the fuel cell, and senses instantaneous levels of post-filter air contaminants. In response to the instantaneous level of any particular air contaminant of the post-filter air contaminants being above a respective threshold level, the environmental sensor array may protect the operation of the fuel cell (e.g., de-rate, shut down, etc.).

8 Claims, 24 Drawing Sheets

(56) References Cited

U.S. PATENT DOCUMENTS

| | | | | |
|---|---|---|---|---|
| 7,449,046 | B2 * | 11/2008 | Schroeter | H01M 8/0662 55/283 |
| 8,597,839 | B2 * | 12/2013 | Kanazu | C01B 3/384 429/423 |
| 8,808,932 | B2 * | 8/2014 | Baika | H01M 8/04089 429/408 |
| 9,126,894 | B2 | 9/2015 | Rohrl | |
| 2002/0192516 | A1 * | 12/2002 | Tajima | G06Q 10/06 700/286 |
| 2010/0273068 | A1 | 10/2010 | Crumm et al. | |

OTHER PUBLICATIONS

Zhai, et al., "Influence of Cell Temperature on Sulfur Dioxide Contamination in Proton Exchange Membrane Fuel Cells", Journal of Power Sources, 247 (2014), 40-48, Elsevier.

\* cited by examiner

| LPM OF CONTAMINATED AIR THROUGH THE FILTER (FILTER A OR B) 710 | TIME TO BREAKTHROUGH (HRS) 720 | TOTAL SO2 EXPOSURE AT BREAKTHROUGH (L of 12ppm SO2 IN AIR) 730 | mg SO2 ADSORBED ONTO FILTER AT BREAKTHROUGH 740 | mg SO2/cm2 (ADSORBENT) 750 |
|---|---|---|---|---|
| 100.00 (A) | 6.66 | 58.80 | 1237125.00 | 740.38 |
| 75.00 (A) | 47.37 | 312.40 | 6572896.00 | 3933.59 |
| 50.00 (A) | 94.69 | 415.04 | 8732441.60 | 5225.99 |
| 25.00 (A) | 183.00 | 402.30 | 8464392.00 | 5065.57 |
| 25.00 (A) | 177.00 | 392.00 | 8247680.00 | 4935.88 |
| ----- | ----- | ----- | ----- | ----- |
| 100.00 (B) | 0.22 | 1.90 | 39976.00 | 91.37 |
| 75.00 (B) | 4.08 | 17.96 | 377836.32 | 863.63 |
| 50.00 (B) | 45.25 | 98.67 | 2076016.80 | 4745.19 |
| 25.00 (B) | 137.60 | 151.08 | 3178723.20 | 7265.67 |

FIG. 7

| SENSOR 1110 | RANGE 1120 | RESOLUTION 1130 | HIGH ALARM 1140 | LOW ALARM 1150 |
|---|---|---|---|---|
| SO2 | 0-30 ppm | 0.1 ppm | 5 ppm | 0 ppm |
| NO2 | 0-30 ppm | 0.1 ppm | 5 ppm | 0 ppm |
| NO | 0-30 ppm | 0.1 ppm | 5 ppm | 0 ppm |
| H2S | 0-30 ppm | 0.1 ppm | 5 ppm | 0 ppm |
| VOC | 0-20 ppm | 0.01 ppm | 5 ppm | 0 ppm |
| 4-20mA RH/TempF | 0-100%/-40-140 degF | 1%/1 degF | 95%/110 degF | 75%/0 degF |
| 4-20mA Pressure | 0-31 PSIA | 1 PSI | 20 PSI | 10 PSI |

FIG. 11

| | 1410 | 1420 | 1410 | 1420 |
|---|---|---|---|---|
| | H2S | 0.1 | HC | 0.83 |
| | SO2 | 0.1 | PA | 13.7 |
| | NO | 30.0 | NO2 | 0.0 |
| | %RH | 29 | TDF | 75 |

|  | CAN Byte 1810 | DATA 1820 |
|---|---|---|
| MESSAGE #1 | 0 | SO2 ppm LSB |
|  | 1 | SO2 ppm MSB |
|  | 2 | H2S ppm LSB |
|  | 3 | H2S ppm MSB |
|  | 4 | NO ppm LSB |
|  | 5 | NO ppm MSB |
|  | 6 | NO2 ppm LSB |
|  | 7 | NO2 ppm MSB |

|  | | |
|---|---|---|
| MESSAGE #2 | 0 | VOC ppm LSB |
|  | 1 | VOC ppm MSB |
|  | 2 | RH ppm LSB |
|  | 3 | RH ppm MSB |
|  | 4 | Temp ppm LSB |
|  | 5 | Temp ppm MSB |
|  | 6 | Pres. ppm LSB |
|  | 7 | Pres. ppm MSB |

|  | | |
|---|---|---|
| MESSAGE #3 | 0 | Flow lpm LSB |
|  | 1 | Flow lpm MSB |
|  | 2 | AlarmReg1 (High) |
|  | 3 | AlarmReg2 (Low) |
|  | 4 | Spare (x00h) |
|  | 5 | Spare (x00h) |
|  | 6 | Spare (x00h) |
|  | 7 | Spare (x00h) |

FIG. 18

ENVIRONMENTAL SENSOR ARRAY FOR FUEL CELL AIR FILTRATION SYSTEMS

RELATED APPLICATION

This application claims priority to U.S. Provisional Application No. 62/220,520, filed on Sep. 18, 2015, entitled ENVIRONMENTAL SENSOR ARRAY FOR FUEL CELL VEHICLES, by Higgins, et al., the contents of which are hereby incorporated by reference.

GOVERNMENT SUPPORT

This invention was made with government support under grant no. N00014-13-1-0463 awarded by the Department of the Navy/Office of Naval Research. The government has certain rights in the invention.

TECHNICAL FIELD

The present disclosure relates generally to fuel cells, and, more particularly, to an environmental sensor array for fuel cell air filtration systems.

BACKGROUND

Fuel cells are devices that convert chemical energy from a fuel into electricity through a chemical reaction of positively charged hydrogen ions with air (e.g., oxygen and/or other oxidizing agents). Fuel cells, unlike batteries, require a continuous source of fuel and air to sustain the chemical reaction, generally producing electricity continuously for as long as these inputs are supplied. However, both the air and fuel need to be pure with no contaminants, otherwise there is a high risk of destroying the fuel cell. For instance, it is generally known that fuel cell stacks can experience irreversible voltage loss when exposed to certain air contaminants at high concentrations (e.g., sulfur-based air contaminants).

As an example, the Hawai'i Natural Energy Institute is building a fuel cell powered bus to be used in Hawai'i Volcanoes National Park on the Island of Hawaii, where the air contamination generally consists of gases continually erupting from the Kilauea volcano. Sulfur dioxide, carbon dioxide, hydrogen sulfide, hydrogen chloride, hydrogen fluoride, and sulfuric acid are the major airborne pollutants in Volcanoes National Park (e.g., intermittently registering up to 5 ppm $SO_2$ in the atmosphere, with lower concentrations of other air contaminants). The example fuel cell bus will be powered by a large (e.g., 30 KW) fuel cell which will be powered by hydrogen stored on the bus and oxygen obtained from the atmosphere. If the contaminants in the atmosphere are allowed to enter the fuel cell (particularly the membrane electrode assembly, or "MEA"), then the catalyst will be poisoned, thus preventing the fuel cell from operating. Therefore, due to the harsh environmental conditions fuel cells may be exposed to, the air contaminants must be removed for proper fuel cell operation, and for extended fuel cell lifetime.

Current air purifying technologies use a carbon-based filter with a fixed lifetime, where air filters are merely replaced after a set period of time (e.g., scheduled intervals). However, there is currently no way of knowing when the filter lifetime is complete, which means the filters are either underutilized, wasting resources (filter materials, money, etc.), or over-utilized, potentially allowing dangerous contaminants to enter the fuel cell, thus causing reduced fuel cell power, or even permanent damage to the fuel cell.

SUMMARY

According to one or more embodiments of the disclosure, an environmental sensor array monitors pre-filter airflow to a fuel cell with an air filter, and senses amounts of filter exposure of one or more air contaminants in the monitored pre-filter airflow. The environmental sensor array may then correlate the sensed amounts of filter exposure of the one or more air contaminants over time to a long-term adsorption limit of the one or more air contaminants for the air filter, and may determine a lifetime usage level of the air filter based on the correlating. Accordingly, the environmental sensor array may provide an indication of the lifetime usage level of the air filter.

According to one or more additional embodiments of the disclosure, the environmental sensor array may also monitor post-filter airflow to the fuel cell, and senses instantaneous levels of post-filter air contaminants in the monitored post-filter airflow. As such, the environmental sensor array can determine whether the instantaneous level of any particular air contaminant of the post-filter air contaminants is above a respective threshold level, and can protect the operation of the fuel cell (e.g., de-rate, shut down, etc.) in response to the instantaneous level of any particular air contaminant of the post-filter air contaminants being above the respective threshold level.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example table for contaminant adsorbing rates of fuel cell air filtration systems;

FIG. 11 illustrates an example table of individual sensor parameters for sensors used in an environmental sensor array for fuel cell air filtration systems;

FIG. 14 illustrates an example sensor data display for an environmental sensor array for fuel cell air filtration systems;

FIG. 18 illustrates an example messaging format for use with an environmental sensor array for fuel cell air filtration systems;

DESCRIPTION OF EXAMPLE EMBODIMENTS

As noted above, fuel cells convert chemical energy from a fuel into electricity through a chemical reaction. Proton exchange membrane fuel cells, also known as polymer electrolyte membrane (PEM) fuel cells (PEMFC), are a type of fuel cell being developed for transport (e.g., vehicular) applications as well as for stationary fuel cell applications and portable fuel cell applications.

Figure 1:
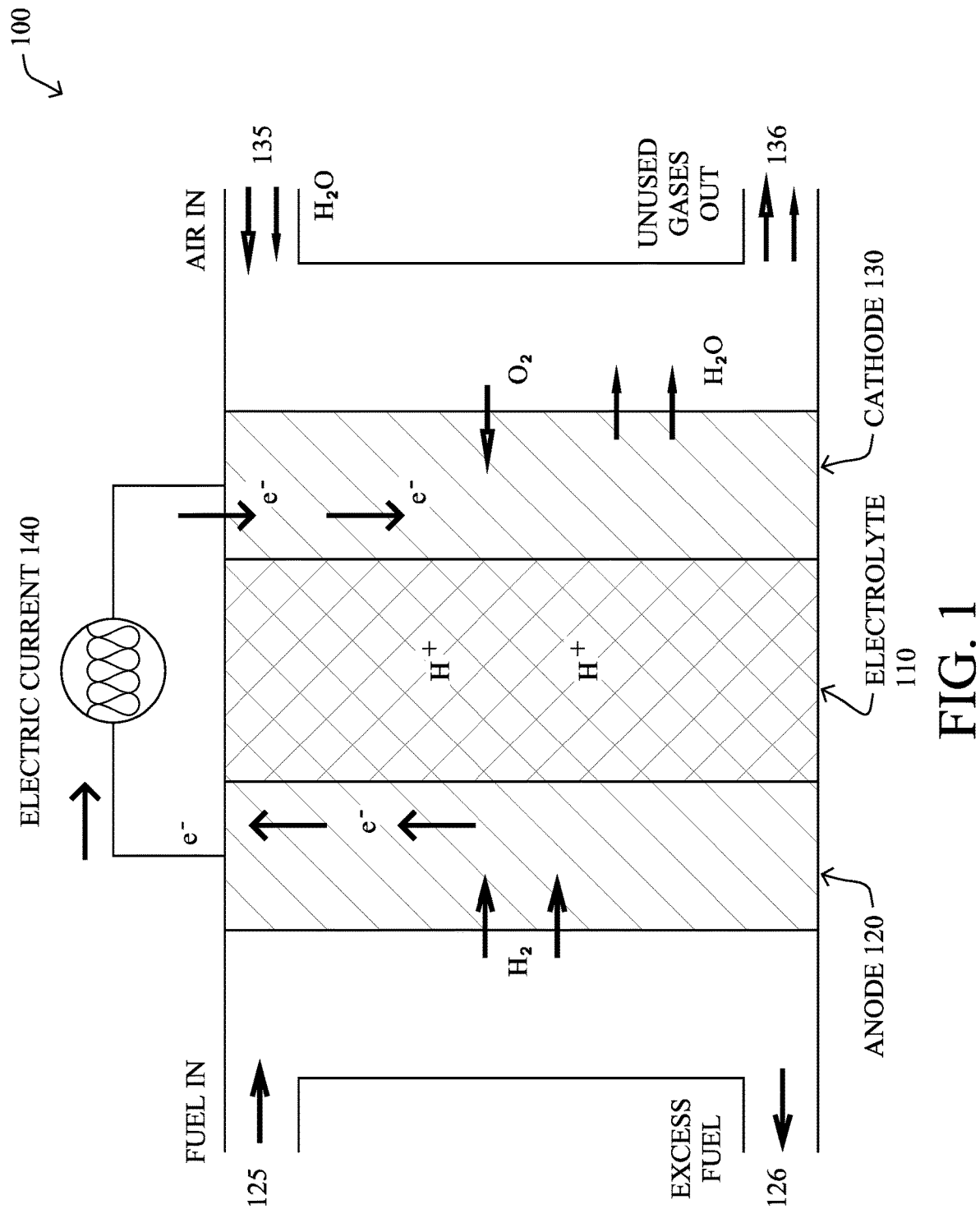
FIG. 1 illustrates an example fuel cell.

FIG. 1 illustrates an example simplified fuel cell 100, where an electrolyte 110 is situated between an anode 120 and cathode 130. Fuel 125, such as hydrogen ($H_2$), enters the anode side of the fuel cell 100, while air 135 (e.g., with water ($H_2O$), oxygen ($O_2$), and other gases) enters the cathode side. Through a chemical reaction (that is generally well understood and outside the scope of the present disclosure), protons are exchanged through a membrane electrode assembly (MEA), i.e., the anode, electrolyte, and cathode, and an electric current 140 is produced through some draw (e.g., a motor, lights, etc.). Excess fuel 126 from the anode side and unused gases 136 from the cathode side may then be released or recirculated.

Figure 2:
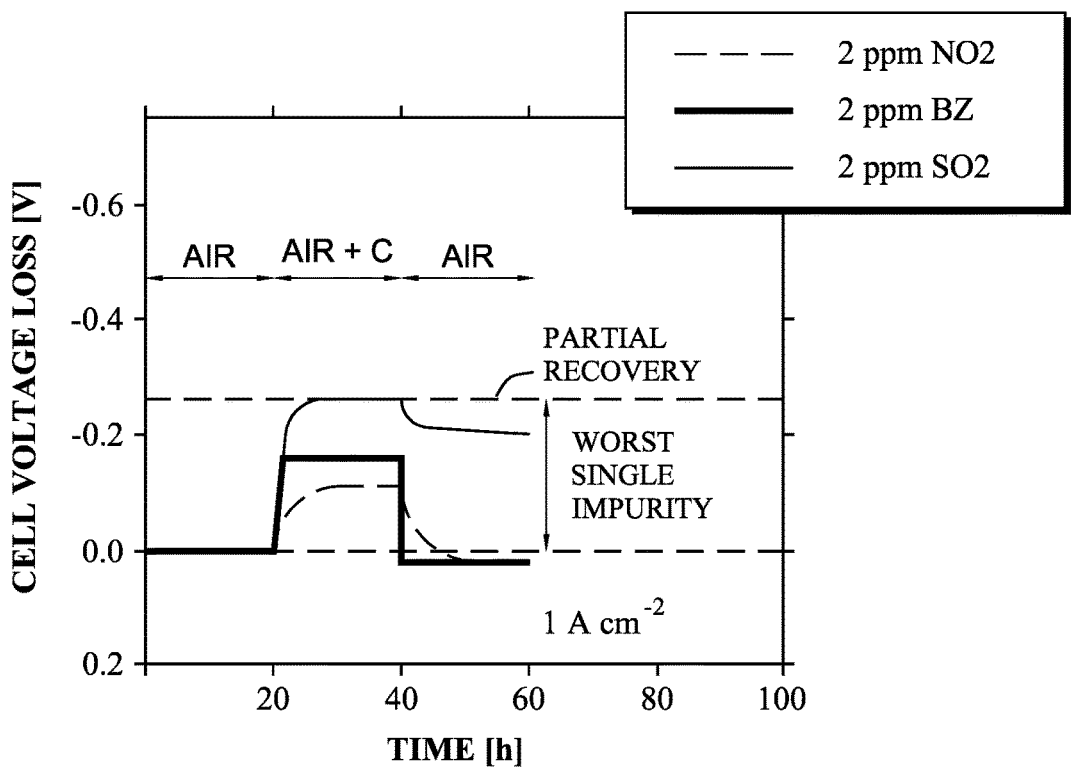
FIG. 2 illustrates an example of fuel cell voltage loss due to exposure to air contaminants.
Figure 2:
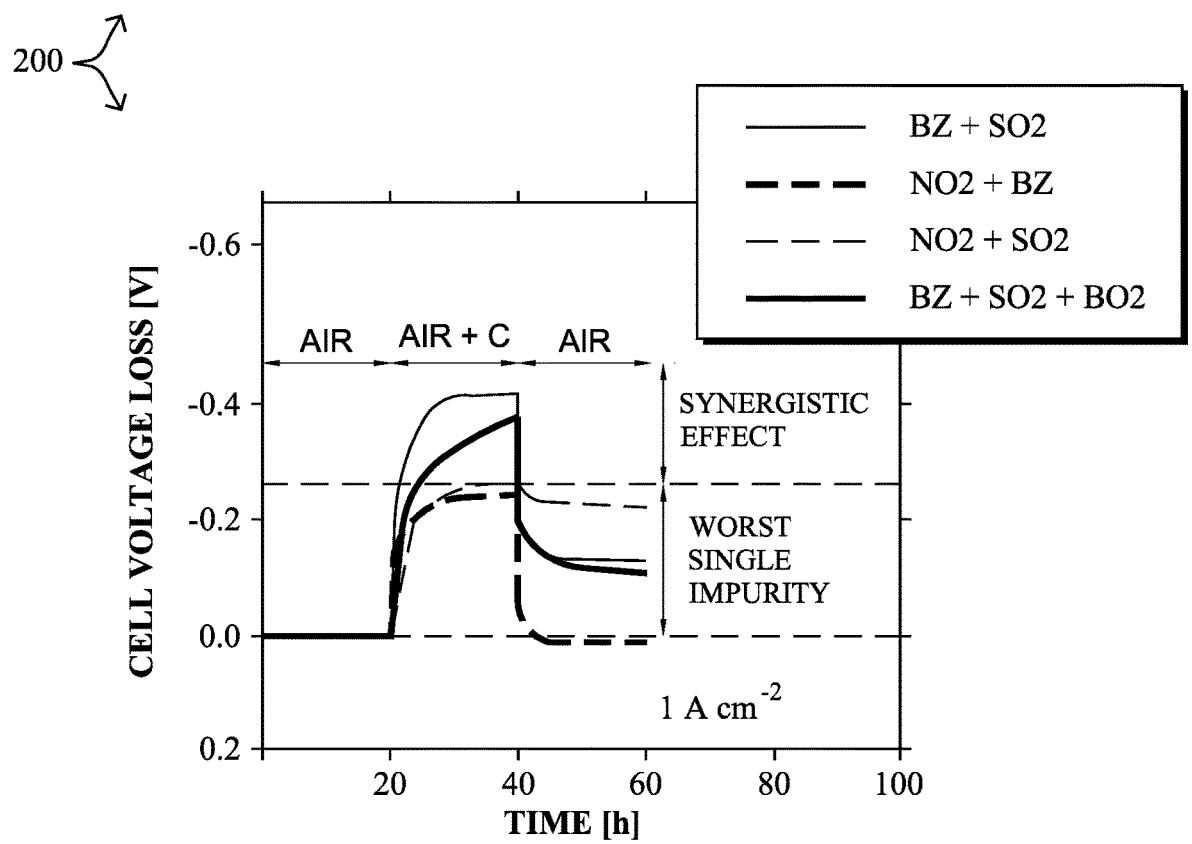

As also noted above, both the air 135 and fuel 125 need to be pure with no contaminants, otherwise there is a high risk of destroying the fuel cell 100. For instance, as shown in the charts 200 of FIG. 2 (adapted from ZHAI, et al., "Influence of Cell Temperature on Sulfur Dioxide Contamination in Proton Exchange Membrane Fuel Cells", Journal of Power Sources, 247 (2014), 40-48), fuel cell stacks can experience irreversible voltage loss when exposed to certain air contaminants at high concentrations (e.g., sulfur-based air contaminants). For example, as shown in the charts on the left, only 2 ppm of $SO_2$ exposure resulted in irrecoverable cell voltage loss. On the other hand, $NO_2$ and benzene both individually caused cell voltage loss, but the voltage level could be substantially recovered with neat (contaminant-free) air over time. Binary and tertiary mixtures (chart on the right) demonstrate a synergistic detrimental effect on cell voltage, as well.

Accordingly, air filtration is extremely important for maintaining fuel cell system performance in harsh environments. Using the example given above, sulfur dioxide ($SO_2$) is the major air contaminant in Hawai'i Volcano National Park. Other air contaminants observed at the park as a result of the erupting Kilauea volcano are carbon dioxide ($CO_2$), hydrogen sulfide ($H_2S$), hydrogen chloride, hydrogen fluoride, "Vog" (volcanic air that consists of moisture droplets in the air that can contain dust particles, sulfuric acid ($H_2SO_4$), sulfur dioxide ($SO_2$), and trace metals (selenium, mercury, arsenic, iridium)), and others. Benzene and acetonitrile are also expected in trace amounts from internal combustion engine exhaust within the park.

Based on scientific monitoring, it was shown that the $SO_2$ concentration at Volcano National Park from August 2011 through July 2012 varied depending on wind direction, but remained below 2 ppm for the majority of the year. Generally, even a concentration of 0.5 ppm $SO_2$ will have some effect on cathode performance of a fuel cell after a certain length of time of exposure to the contaminant. There are times, however, when the $SO_2$ concentration intermittently reaches 5 ppm at the park. It is also important to note that there are detrimental longer-term effects of extended exposure to various contaminants reaching the fuel cell, reducing the overall performance of the fuel cell.

The most common removal method used for removal of sulfur molecules is a base-treated activated carbon filter. The air filter is designed to remove the sulfur molecules through adsorption, where the sulfur molecules essentially "stick" (adsorb) the carbon-based filter, allowing the passage of contaminate free (or reduced contaminate) air. This process creates a film of the adsorbate (sulfur molecules) on the surface of the adsorbent (the filter). Over time, however, the efficacy of the air filter is reduced due to the adsorbate covering the activated carbon filter, at which point what is known as "breakthrough" occurs, allowing unfiltered contaminants to pass through the filter to the fuel cell. Accordingly, current air purifying technologies use a carbon-based to filter with a fixed lifetime, where air filters are replaced at scheduled intervals.

As noted above, however, there is currently no way of knowing when the filter lifetime is complete. Underutilization results in wasted resources, but perhaps an even larger concern is that over-utilization can allow dangerous contaminants to enter the fuel cell, causing reduced power or permanent damage to the fuel cell.

The techniques herein, therefore, provide an "environmental sensor array" that protects fuel cells from degradation by sensing air contamination in the environment and communicating this information to an onboard control system which will monitor the viable lifetime of the air filter, and may enact one or more fuel cell protection actions (e.g., switching the fuel cell off) in the event of high levels of contaminant exposure to the fuel cell. That is, the techniques herein are designed to prevent the fuel cell from using contaminated air, and thus protecting the fuel cell from degradation due to contaminated air entering the fuel cell stack.

Figure 3:
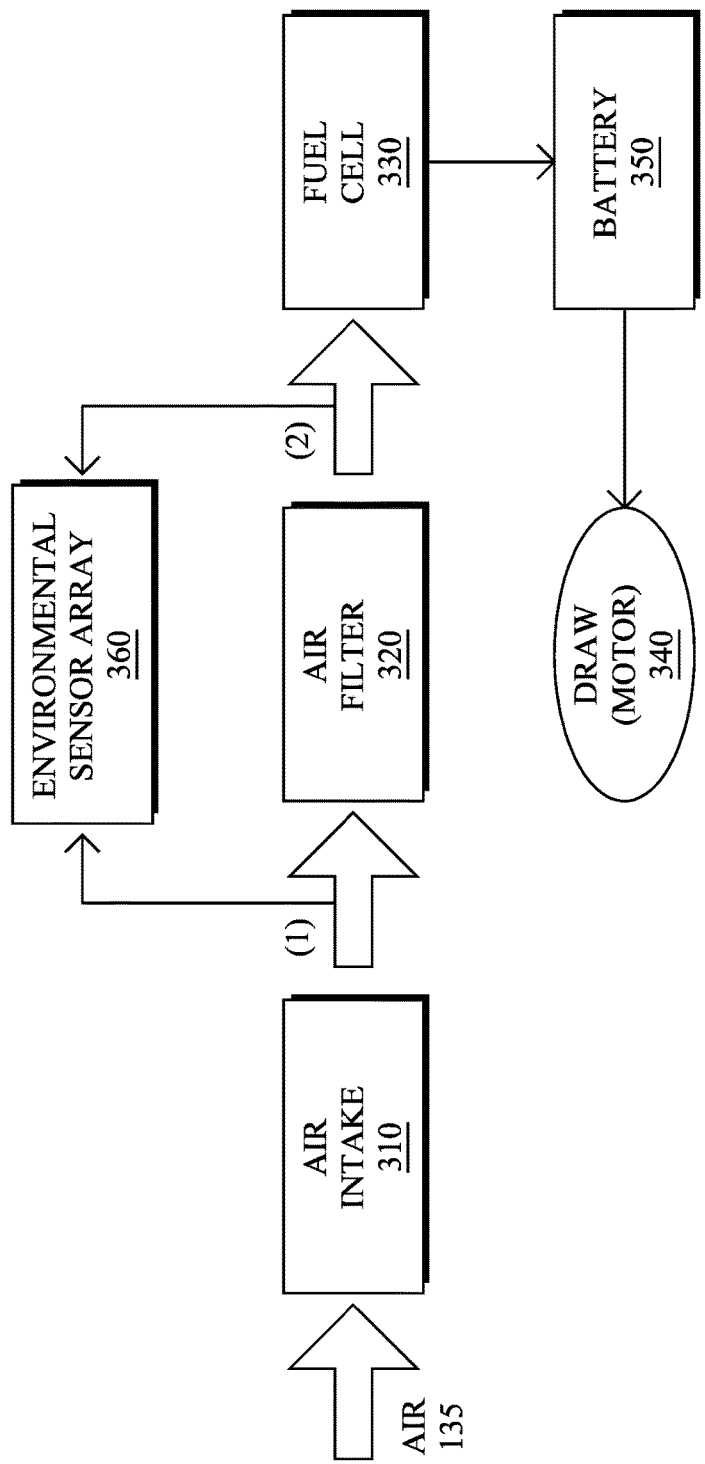
FIG. 3 illustrates an example of an environmental sensor array for fuel cell air filtration systems.

With reference to FIG. 3, and as described in greater detail below, the fuel cell system 300 takes air 135 through an air intake 310 (e.g., blower, ram air, open port, etc.), and passes the air through an air filter 320 (e.g., active and/or passive filtering media) to the fuel cell 330 (e.g., fuel cell 100 above). The fuel cell may then supply an electric current (through battery 350) to a draw 340 (e.g., motor), which may have one or more alternate sources of energy, such as the battery 350 itself.

According to the techniques herein, environmental sensor array 360 utilizes electrochemical sensors to monitor air contamination levels in the atmosphere (e.g., sulfur dioxide, hydrogen sulfide, nitric oxide, nitrogen dioxide, and volatile organic compounds, particularly for the volcano example, though any environment may benefit from the techniques herein with aptly chosen electrochemical sensors). In particular, the environmental sensor array 360 monitors the environmental air contamination levels ("pre-filter" airflow "135(1)"), and also monitors the concentrations of contaminants in the air inlet at the fuel cell after the air has passed through the air filter ("post-filter" airflow "135(2)"). Notably, and as described below, the environmental sensor array may also monitor and communicate other environmental conditions and attributes, such as temperature, relative humidity, atmospheric pressure, global positioning system (GPS) location, and so on.

As described herein, the techniques herein allow the cumulative effect of the contaminants which are exposed to the filter (pre-filter airflow (1)) to be summed up, allowing a filter lifetime or percent used to be calculated. For example, as described below, various models may be created to determine a useful lifetime of an air filter once exposed to certain amounts of air contaminants over time, and this information may be used to suggest a proper filter maintenance schedule based on individual filter exposure.

The techniques herein also perform the same sensing function at the inlet of the fuel cell (post-filter airflow (2)), after the air filter 320 has already filtered the airflow 135, such that the environmental sensor array 360 can immediately sense if there are contaminants entering the fuel cell (through an air filter malfunction or breakthrough), allowing the fuel cell software to initiate an emergency procedure (e.g., shut down), preventing catastrophic failure of the fuel cell 330.

Figure 4:
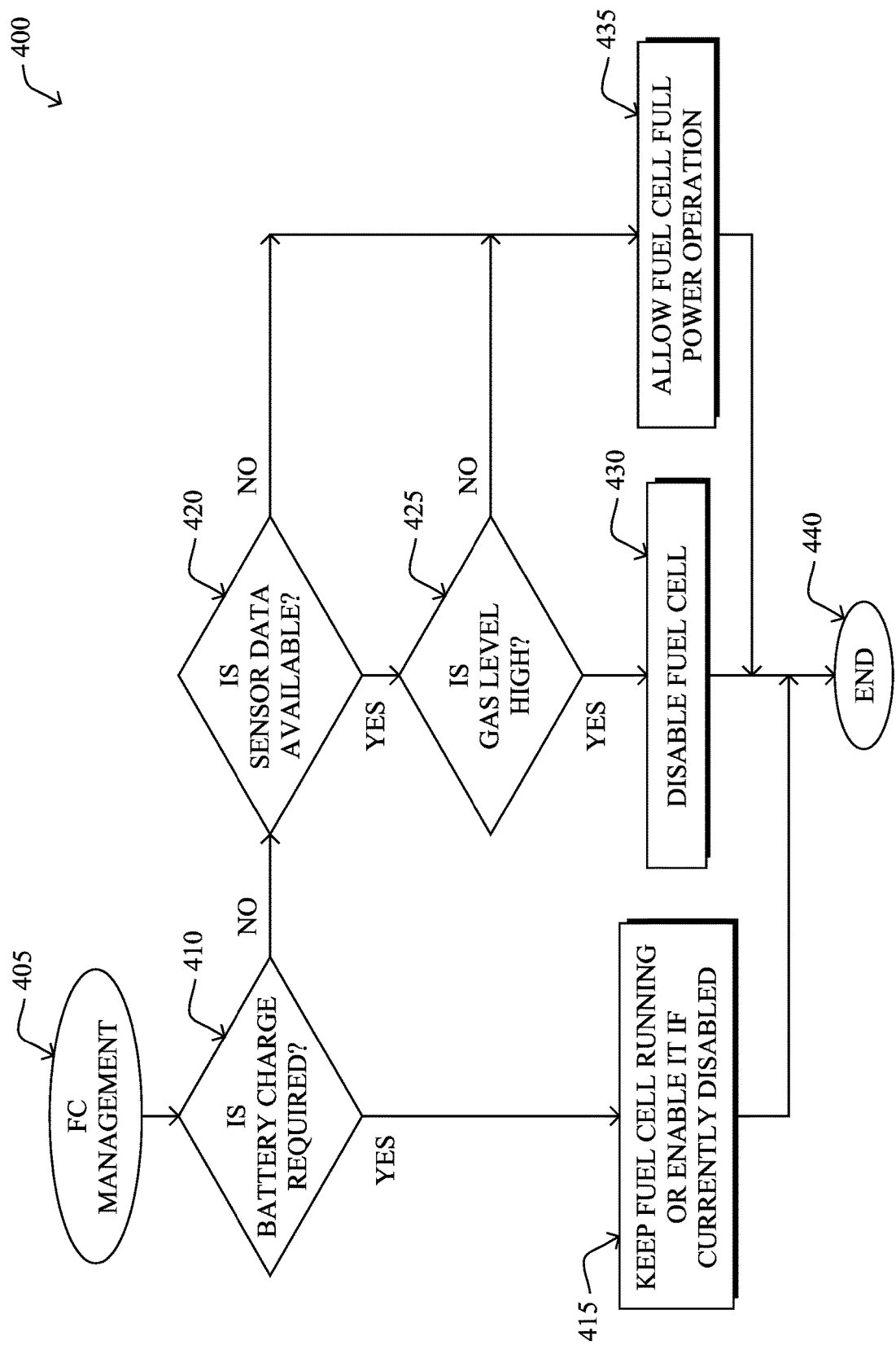
FIG. 4 illustrates an example simplified procedure for fuel cell control according to contaminant data from an environmental sensor array for fuel cell air filtration systems.

For example, as shown in FIG. 4, a simplified procedure 400 for emergency fuel cell management is shown, where fuel cell (FC) management begins in step 405, and while a battery charge (state of charge, or SoC) requires a charge in step 410, then the fuel cell is kept running or enabled in step 415. However, if the battery is charging, or the system (e.g., vehicle) is otherwise set to use the fuel cell, then in step 420 it is determined whether sensor data is available. If so, and if the contaminant gas level is high in step 425, then in step 430 the fuel cell is disabled. During this protective mode, the system (e.g., vehicle) will operate solely on an alternate source of power (e.g., battery power) and the fuel cell may be restarted when the contaminant levels are deemed safe. On the other hand, while there is no data available or there are low contaminant gases, the fuel cell is allowed to operate in full power operation mode in step 435. The example (and non-limiting) illustrative procedure 400 may then end in step 440, notably with the option to continue the protective fuel cell maintenance based on the post-filter airflow.

Figure 5A:
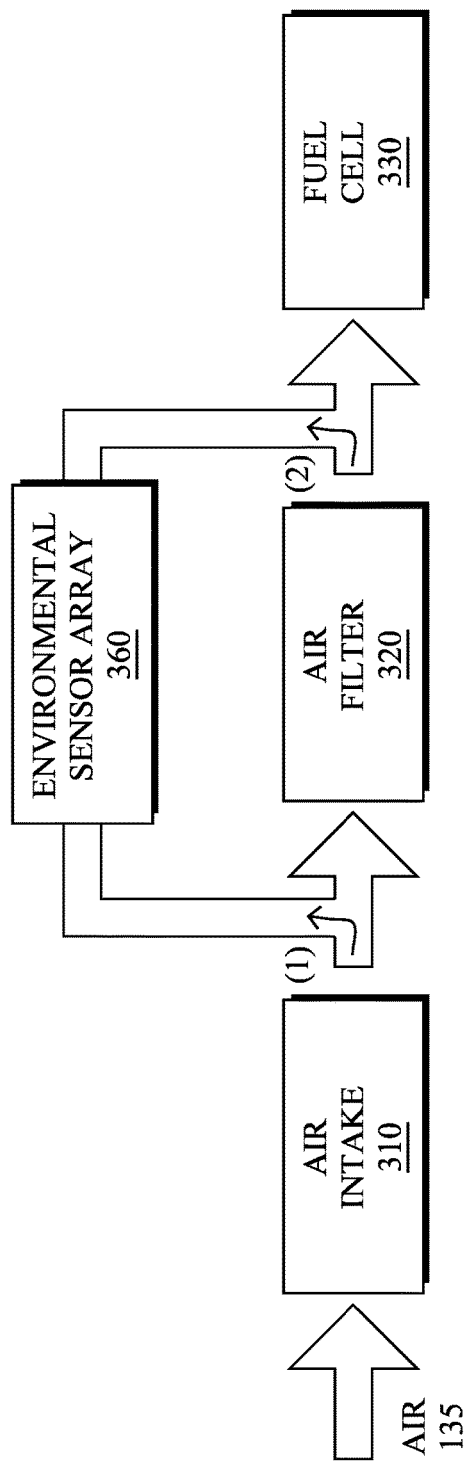
FIGS. 5A-5B illustrate an example sensor and airflow configurations of environmental sensor arrays for fuel cell air filtration systems.
Figure 5B:
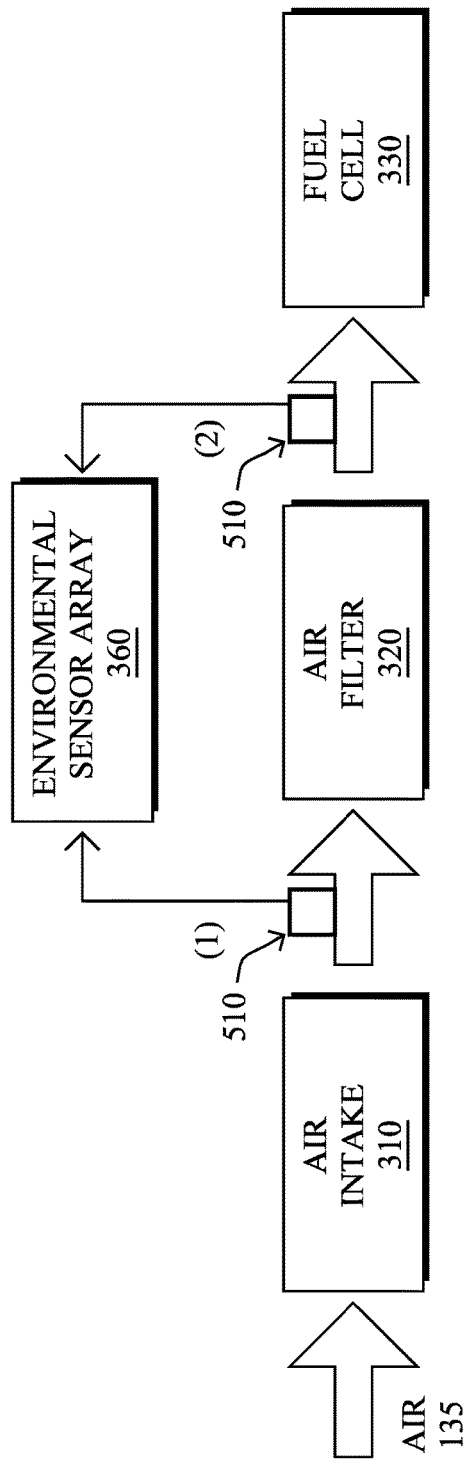

According to one or more embodiments of the techniques herein, the environmental sensor array 360 may be arranged in a number of manners with respect to the airflow 135. For instance, while FIG. 3 illustrates a single sensor array 360 connected to both sides of the air filter 320, alternative embodiments may call for a separate environmental sensor array for each side of the air filter. In such embodiments, the individual sensor arrays may, though need not, be configured to communicate with one another. Also, FIG. 5A illustrates the example fuel cell system 300 of FIG. 3 above, particularly detailing one embodiment where takeoff airflow piping may be configured to pipe a portion of the airflow from the fuel cell airflow system to sensors contained within the array 360. Alternatively, however, FIG. 5B illustrates another embodiment where sensors 510 are placed directly within the airflow stream, and electronic communication (e.g., voltage levels or more sophisticated communication) brings the relevant data to the computational portions of the environmental sensor array 360.

Figure 6:
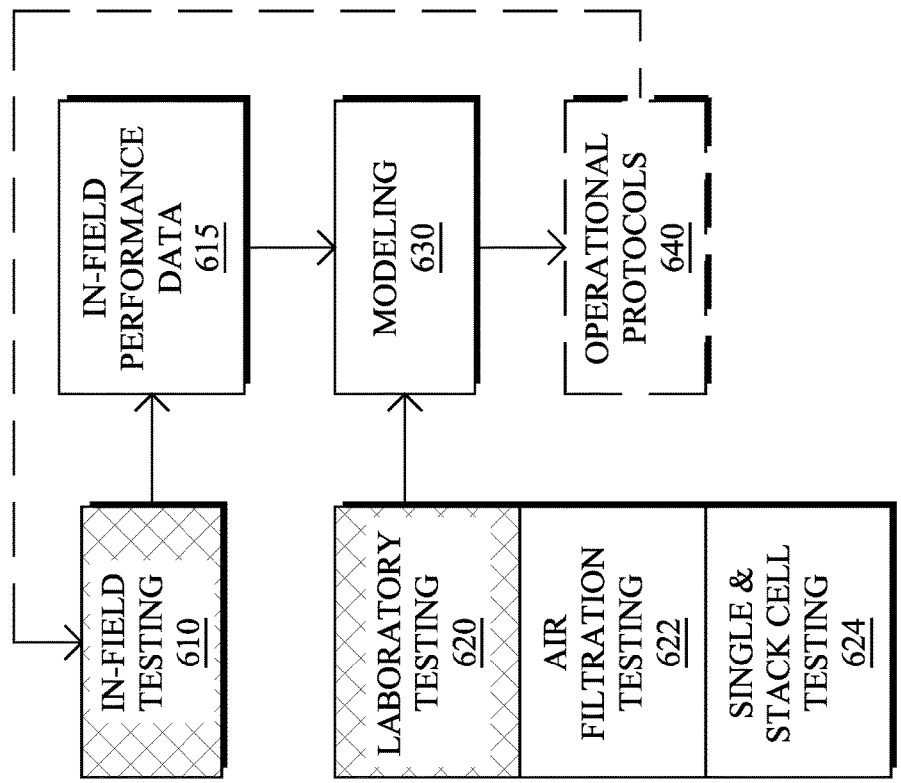
FIG. 6 illustrates an example simplified procedure for testing-based modelling of parameters used by an environmental sensor array for fuel cell air filtration systems.

The functionality of the environmental sensor array 360, particularly the air filter utilization and life span calculations, as well as real-time protection algorithms, may be based on an integrated predictive model, combining laboratory data from air filtration and single cell contaminant testing, in order to develop a predictive performance model for fuel cell use in harsh environments. FIG. 6 illustrates an example simplified procedure (system) 600 for testing-based modelling of parameters, where distributed real-time environmental information (in-field testing) 610 may be communicated to a centralized repository of in-field performance data 615. Additionally, lab experiments 620 were used to predict instantaneous and long-term contamination limits to protect the fuel cell from a harsh environment (e.g., introducing air contaminants such as $SO_2$, $NO_2$, and benzene into single cell fuel cells and fuel cell stacks to determine the effects on power levels and lifetime). In particular, by conduct air contaminant filtration testing 622, using both single cell and stack cell testing techniques 624, performance requirements were developed for contaminant mitigation systems. Specifically, the in-field performance data 615 and laboratory testing 620, allow for modeling 630 to establish operational protocols 640 (which may be validated by further in-field testing 610).

There are two major distributers of base-treated activated carbon filters, producing filters for fuel cells that are referred to herein as "filler A" and "filler B", respectively. Both filters claim to have removal rates of 97% for $SO_2$ at 30 ppm, but the removal rates were based on limited in-house experimentation by the manufacturers. Since the air quality is critical to the performance of the fuel cell operation, it is equally critical that the fundamental interaction of the multiple air contaminants with each other and with the filter be better understood. Accordingly, further laboratory experimentation was performed in order to understand the individual and combined removal rates of certain contaminants at the concentrations anticipated to be prevalent in real-world harsh environments. Such air filter testing allowed the development of performance models for filtration systems based on a determined filtration capacity of various (e.g., commercially available) air filters and fuel cell performance parameters under simulated real-world conditions in proportion to flowrate. These filtration performance models were then incorporated into control software for real-world operation of the techniques herein.

As an example of the filter experiments performed, breakthrough adsorption experiments were performed on filters A and B using a challenge gas of 12 ppm $SO_2$ in air at a range of flowrates chosen to simulate the performance of large scale filters (e.g., for use on a fuel cell bus). To relate laboratory scale to real-world environments, face velocity is used:

$$\{\text{Face velocity} = \text{Volume flow rate/Media area}\} \qquad \text{Eq. 1.}$$

The cathode air flowrate required for maximum power of an illustrative 30 KW fuel cell is approximately 1700 L/min. The medium will then be 850 L/min. Filter A is a filter sized based on the maximum flowrate of 1700 L/min. A lab scale equivalent which uses the same activated carbon adsorbent material from filter A was used. The ratio of area of a full-scale filter A to lab-scale filter A was 11:3:1. Therefore all filter experiments were conducted in the range of 0 to 100 L/min. Additionally, filter efficiency was calculated for the experiments as follows:

$$\{\text{Efficiency}=100\%-(\text{Concentrations at Outlet/Inlet})\}. \quad \text{Eq. 2.}$$

FIG. 7 illustrates an example experimental result table 700 that lists the results of breakthrough experiments using 12 ppm $SO_2$ in air at a range of flowrates from 0-100 LPM (column 710). The other shown columns include time to breakthrough (720), total $SO_2$ exposure at breakthrough (720), milligrams of $SO_2$ adsorbed onto the filter at breakthrough (740), and milligrams of $SO_2/cm^2$ of the adsorbent (750). This table shows that the total $SO_2$ adsorbed onto the filtration media changes with flowrate. At the faster flowrates the amount of $SO_2$ adsorbed (trig $SO_2/cm^2$ adsorbent, column 750) is reduced, probably due to the fast exposure time compared with kinetics. Filter A appears steady in the amount of $SO_2$ adsorbed at flowrates lower than 50 LPM. Filter B appears to be much more sensitive to flowrate with a continual improvement in $SO_2$ adsorbed as flowrate is lowered. Due to the higher performance at the upper ranges, Filter A was selected for use for the fuel cell systems herein. Notably, any suitable filter with any suitable results may be used.

According to the techniques herein, the fuel cell system (e.g., vehicle) will use the custom environmental sensor array 360 to sense the air contaminants and shut down the fuel cell if the air contaminants reach a dangerous level (e.g., if the $SO_2$ level at the fuel cell (post-filter air) is above 0.5 ppm). Filter lifetime of the fuel cell is also determined based on the integration of contaminant (e.g., $SO_2$) exposure (atmospheric levels) over time. Since the flowrate is critical to the amount of contaminant (e.g., $SO_2$) adsorbed onto the filter, the breakthrough adsorbent limits in the table 700 above may be multiplied by the size ratio of the real-world filter to the lab filter, and those limits may be assumed to be the breakthrough limits for contaminant exposure on the real-world air filters. The environmental sensor array software consistently integrates the amount of contaminant exposure and correlates the percentage of filter used according to the adsorption limits at that flowrate (interpolation being performed where needed). Also, the filter lifetime (e.g., percentages) will be calculated over time and displayed (e.g., a monitoring system, a driver, a maintenance personnel, etc.) to allow the filter to be replaced before breakthrough occurs.

Figure 8:
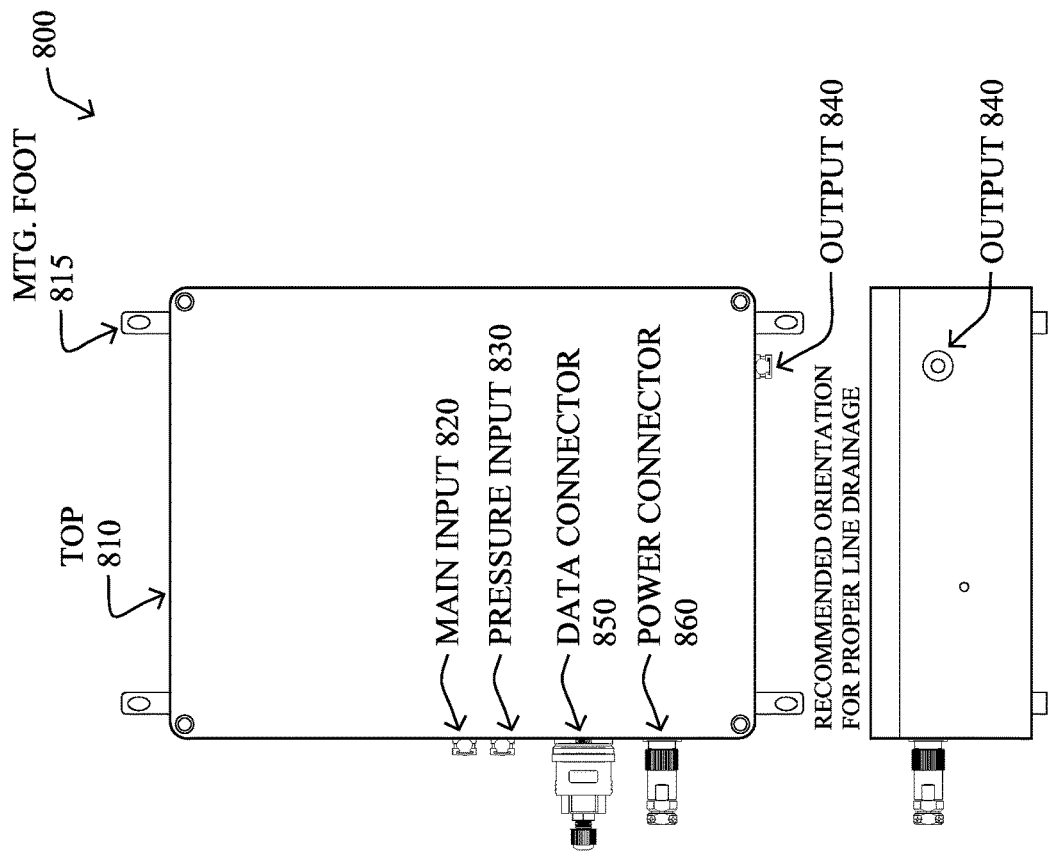
FIG. 8 illustrates an example enclosure for an environmental sensor array for fuel cell air filtration systems.
Figure 8:
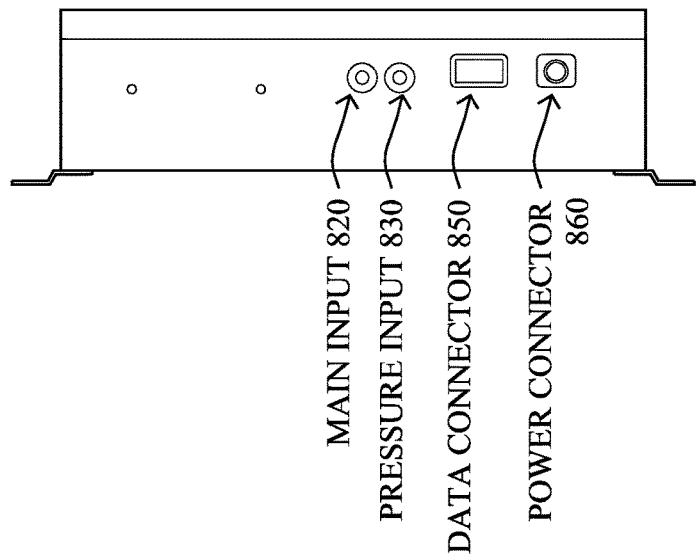

FIG. 8 illustrates an example of an enclosure 800 for the environmental sensor array 360 herein (e.g., shown as a single box (single input) configured to sense one side of the airflow 135 at a time, thus requiring two separate enclosures 800 for the complete pre-filter and post-filter embodiments described herein). Specifically, the illustrative enclosure comprises an outer casing 810 (e.g., with a plurality of mounting feet 815), and a main input 820 for receiving airflow 135 (or in an alternative embodiment, sensor signals from remote sensors 510). A separate pressure input 830 may be used to monitor atmospheric (barometric) pressure of the fuel cell environment. Output 840 allows for passage of the monitored airflow through the device, and illustratively is located at the gravitational bottom of the enclosure 800 to allow for proper line drainage (e.g., of condensation or other matter). Further, one or more data connectors 850 and a power connector 860 may also be located, and specifically designed for the environment in which the sensor array 360 is configured to operate.

Figure 9:
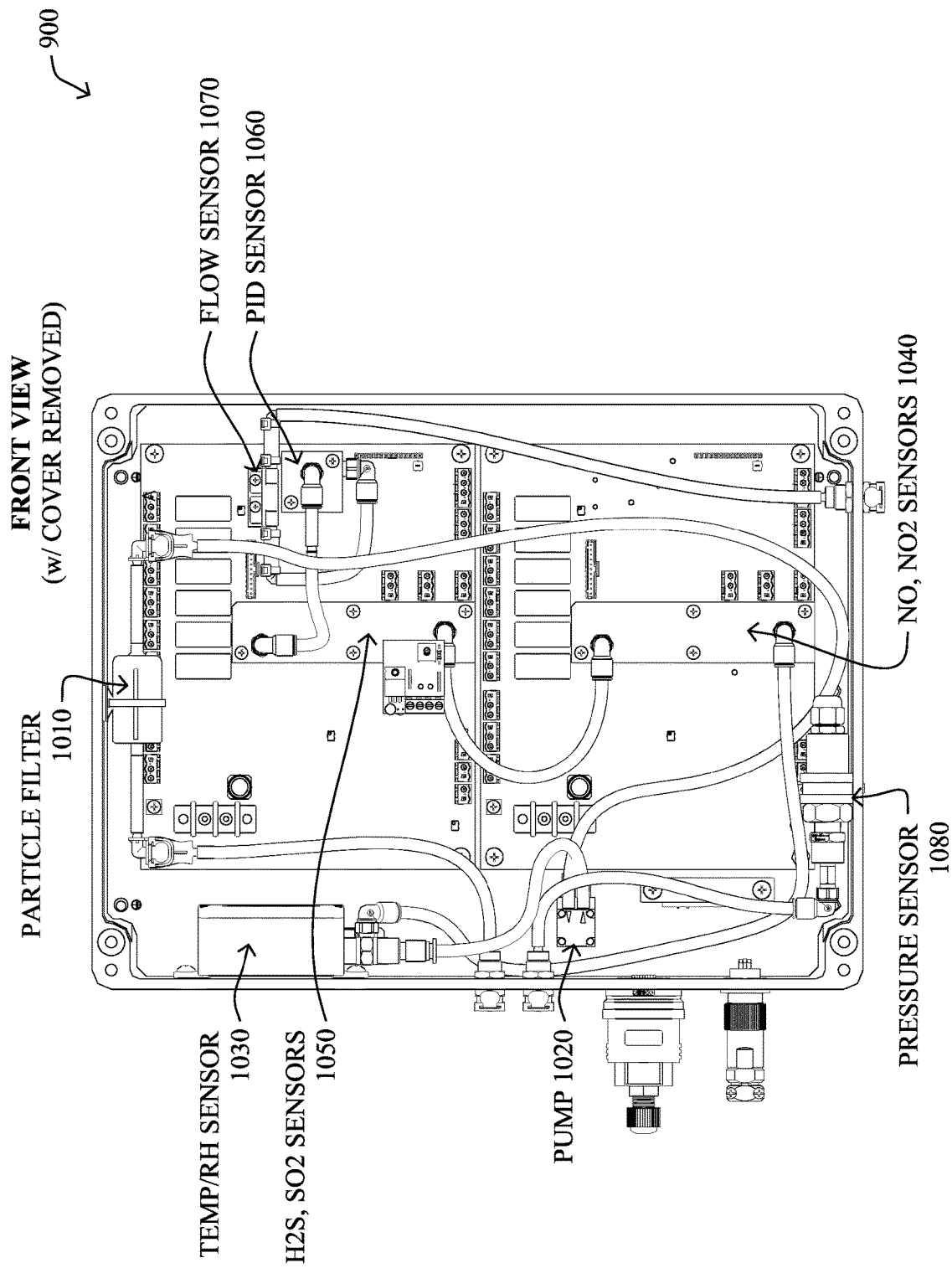
FIG. 9 illustrates an example interior physical configuration for an environmental sensor array for fuel cell air filtration systems.
Figure 10:
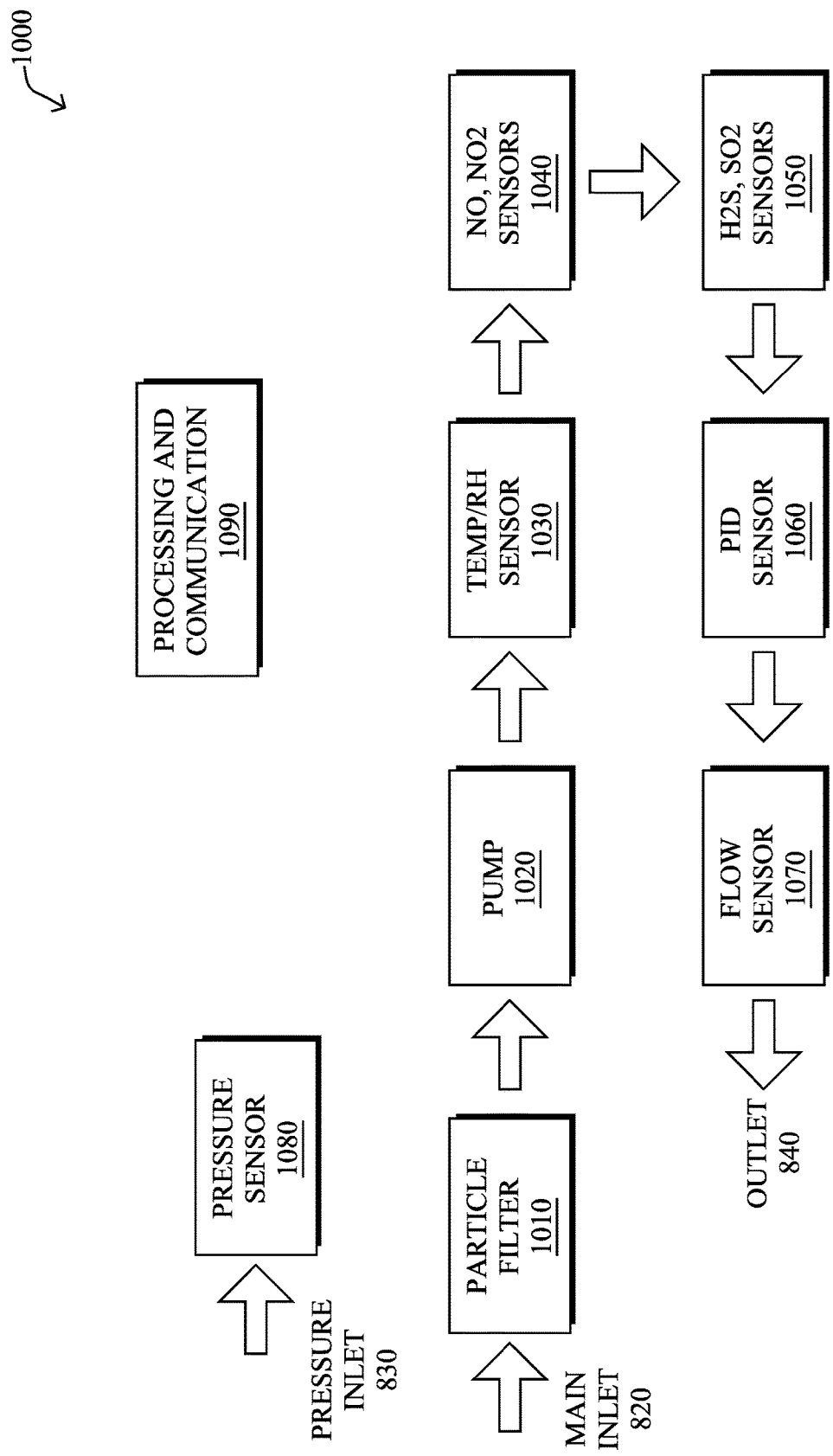
FIG. 10 illustrates an example block diagram of a configuration of an environmental sensor array for fuel cell air filtration systems.

FIG. 9 illustrates an example interior physical configuration 900 for an environmental sensor array 360, such as the enclosure 800 of FIG. 8 with the cover removed. A block diagram configuration 1000 of the interior of an environmental sensor array 360 is also shown in FIG. 10. Notably, the configurations shown are merely examples with example components and connectivity, and the specifics shown and described herein are not meant to be limiting to the scope of the present disclosure.

Illustratively, a main inlet 820 brings air through a particle filter 1010, and through a pump 1020 to pressurize the airflow through the sensors that follow. In particular, such sensors may comprise (and in any order) a temperature (T) and relative humidity (RH) sensor 1030, NO and $NO_2$ sensors 1040 (which may or may not be collocated), $H_2S$ and $SO_2$ sensors 1050 (again, which may or may not be collocated), a photoionization detector (PID) sensor 1060 (e.g., using light, such as ultraviolet light, to measure volatile organic compounds, VOCs), and a flow sensor 1070 to determine the amount of airflow through the sensor system to the outlet 840. In addition to the main inlet flow, a pressure inlet/input 830 leads to a pressure (P) sensor 1080 in order to sense the atmospheric pressure of the surrounding environment. Note that other sensors or fewer sensors may be used, and those shown herein are merely examples. For instance, a hydrogen fluoride (HF) sensor, a hydrogen chloride (HCl) sensor, an $H_2SO_4$ sensor, or other sensors may be used within the environmental sensor array herein. Lastly, a processing and communication circuit 1090 (module, microprocessor, circuitry, etc.) may receive data and/or voltages from the sensors, and may perform the computations and communications described herein. That is, the processing circuit 1090 will determine pre-filter and/or post-filter contaminant concentration (e.g., $SO_2$, $H_2S$, $NO_2$, NO, VOC, HF, etc.) along with environmental conditions (T, P, RH), and can correlate such data into filter lifetime levels, fuel cell performance, and so on, as described herein.

FIG. 11 illustrates an example table 1100 of individual sensor parameters for sensors used in an environmental sensor array 360 for fuel cell air filtration systems herein. For instance, the various sensors 1110 may be configured to provide a range 1120 (e.g., in parts per million, ppm) at a given resolution 1130 (e.g., in ppm). In addition, a high alarm 1140 and low alarm 1150 may be configured on each sensor, as well. Note that the example sensors shown are merely examples, and not meant to be limiting to the scope of the embodiments herein.

Note that the various gas sensors may need to be calibrated, whether initially or periodically. In order to perform such a calibration, a technician may access the environmental sensor array 360 and coordinate a series of test gases to be sensed by the sensors. For example, calibrating an $SO_2$ sensor may be performed by selecting a calibration mode for the sensor, and inputting a known quantity test gas of $SO_2$ into the sensor array (e.g., 20.0 ppm), such that the sensor (and associated software) can calibrate its output values to match that input test gas level (e.g., to 20.0 ppm). Other techniques for calibration may be understood by those skilled in the art, and any such techniques may be used with the embodiments herein.

Figure 12A:
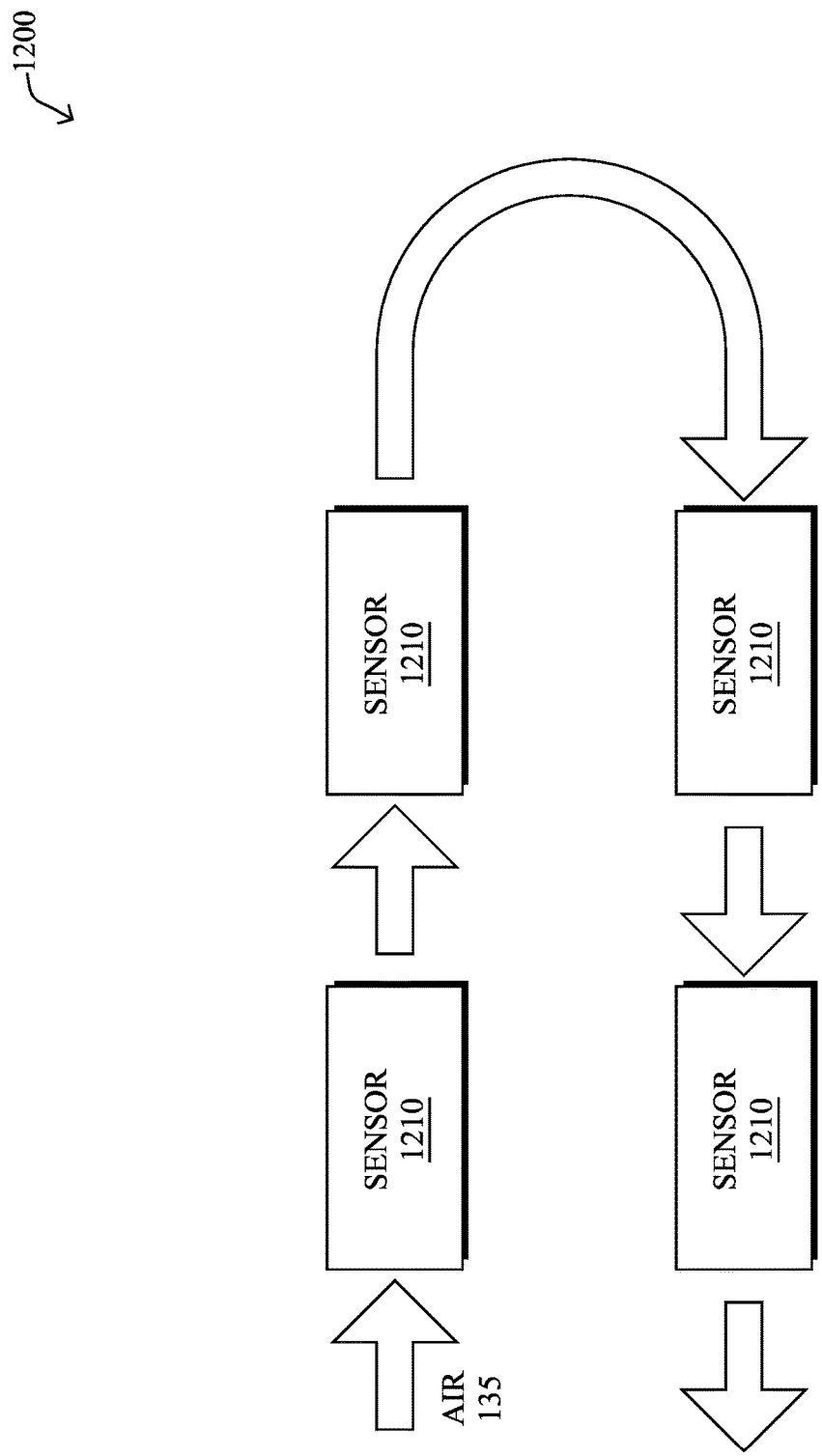
FIGS. 12A-12B illustrate examples of sensors in different airflow configurations.
Figure 12B:
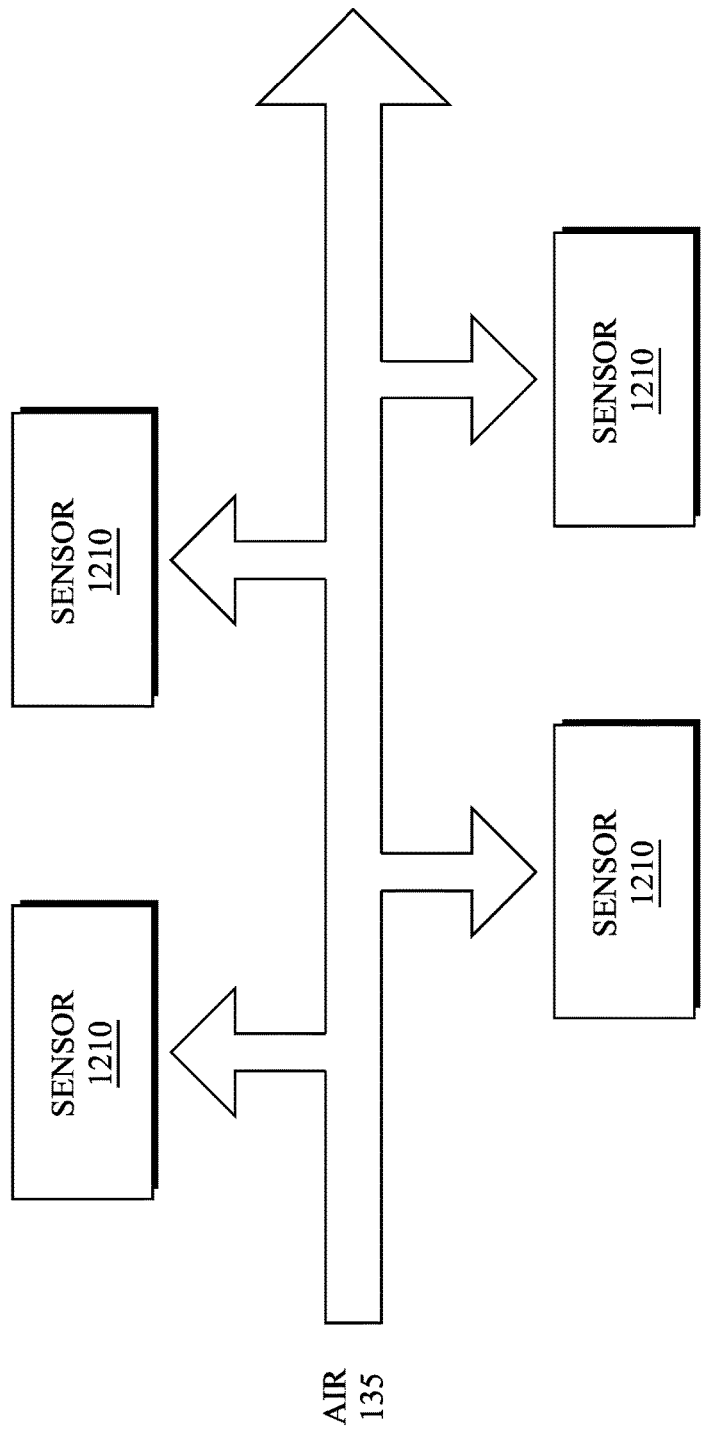

Note further that the airflow pattern shown in FIGS. 9-10 is one example, though other configurations may exist depending upon the capabilities and/or design of the filters used. For example, FIG. 12A illustrates a series configuration 1200 of sensors 1210 (generically), similar to the configuration shown in FIGS. 9-10, while FIG. 12B illustrates an alternative example of sensors 1210 in a different airflow configuration, such as with offshoot branches to each sensor. Other configurations still, such as parallel, hub-and-spoke, and combinations of different configurations on a per-sensor level may be used, and the views shown herein are merely meant to be example embodiments.

According to one or more embodiments of the present disclosure, data is integrated by the environmental sensor array 360 for continuous, total contaminant exposure, and compared to predictive air filter lifetime models for air filter maintenance and fuel cell system operation (and protection) protocols. For instance, based on air contaminant concentrations (e.g., $SO_2$, $H_2S$, $NO_2$, NO, HF, VOC, etc.), as well as other attributes such as temperature, relative humidity, atmospheric pressure, etc., the environmental sensor array 360 can correlate air quality entering the fuel cell filter over time into a lifetime usage level for the filter. The environmental sensor array may also detect air filter failure or other breakthrough issues and cause a prompt emergency shut-down of the fuel cell for protection of the fuel cell against operation while exposed to high levels of contaminated airflow.

Figure 13:
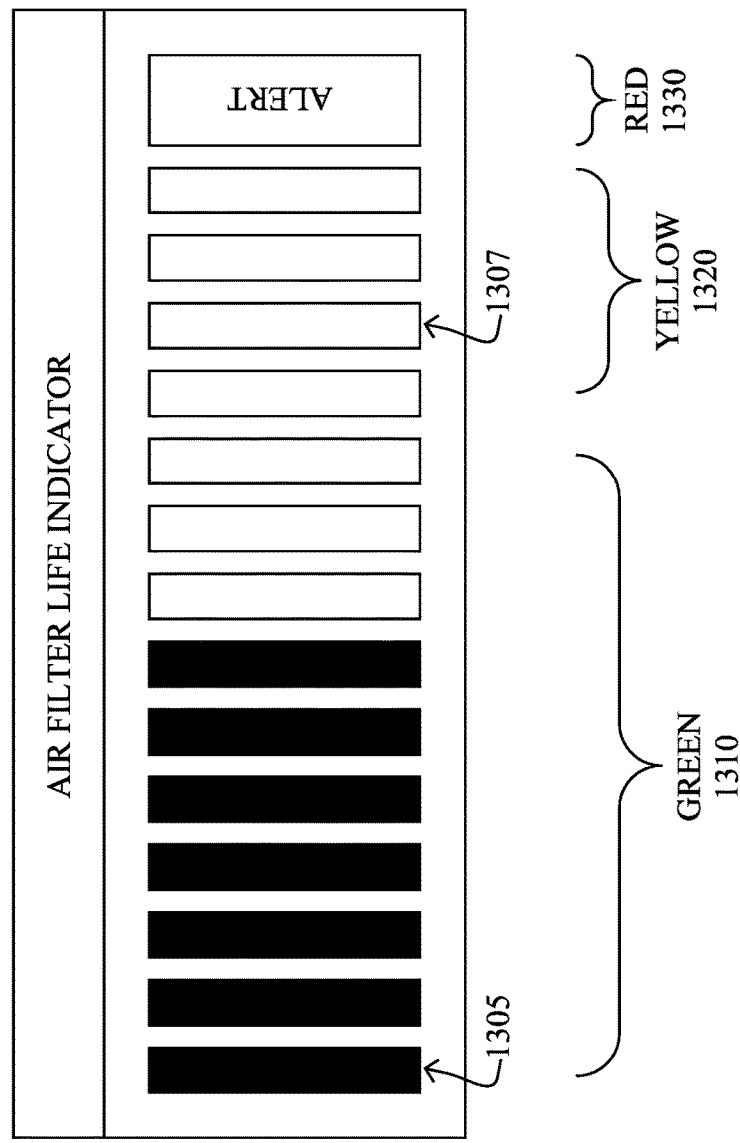
FIG. 13 illustrates an example of an air filter life indicator for an environmental sensor array for fuel cell air filtration systems.

In particular, FIG. 13 illustrates an example of an air filter life indicator 1300 for an environmental sensor array 360 for fuel cell air filtration systems. Onboard software control from the sensor array may utilize predictive modeling (e.g., based on the experimental results obtained as described above) to interpret and display fuel cell lifetime usage levels to a driver, administrator, or otherwise. In the example arrangement shown, various indicator lights may illuminate (1305) or remain unilluminated (1307) to indicate a lifetime usage, such as a sliding range where different color ranges (e.g., green 1310, yellow or amber 1320, and red 1330) indicate both a relative time to perform air filter maintenance (e.g., replacing the filter) and an increasing sense of urgency to replace the filter before breakthrough is estimated to occur based on actual exposure to air contaminates. Other information may be displayed, such as fuel cell state, protection mode lights, etc., and other forms of displays may be used, such as numerical indicators (e.g., percent used, percent remaining, time used, time remaining, etc.).

Additionally, FIG. 14 illustrates an example sensor data display 1400 that may indicate real-time sensed data for the environmental sensor array 360 herein. For instance, the example display 1400 may be a liquid crystal display (LCD) or other type of display screen, where a set of sensor labels 1410 (e.g., "H2S", "HC", "SO2", etc.) and sensor values 1420 (e.g., 0.1, 0.83, 0.1, etc.) are configured to show the detected values, whether real-time, cumulative, average, maximum, minimum, etc. Any configuration of displayed information may be presented by display 1400, and the view shown herein is merely an example implementation. Moreover, display 1400 and indicator 1300 may be integrated into a single display, and need not be separated as shown and described herein.

According to one or more additional embodiments of the present disclosure, the environmental sensor array 360 may also collect sensor data from post-filter air for instantaneous contaminant exposure to the fuel cell, and compares those exposure levels to known (e.g., experimentally determined and/or manufacturer recommended) limits to determine whether to enact one or more fuel cell system protection protocols. In particular, when one or more air contaminants reach a dangerous level (e.g., whether individually or in some combination) at the fuel cell cathode (based on post-filter airflow 135(2)), the environmental sensor array 360 may trigger any number of configured protection mechanisms. For instance, such protection mechanisms may include one or more actions such as indicating a warning to an operator, de-rating the fuel cell, shutting down the fuel cell, switching to an alternate power supply (e.g., battery), switching to an alternate air supply (e.g., spare contaminate-free air canisters for extreme/emergency situations), switching to an alternate/standby air filter, and so on.

Figure 15:
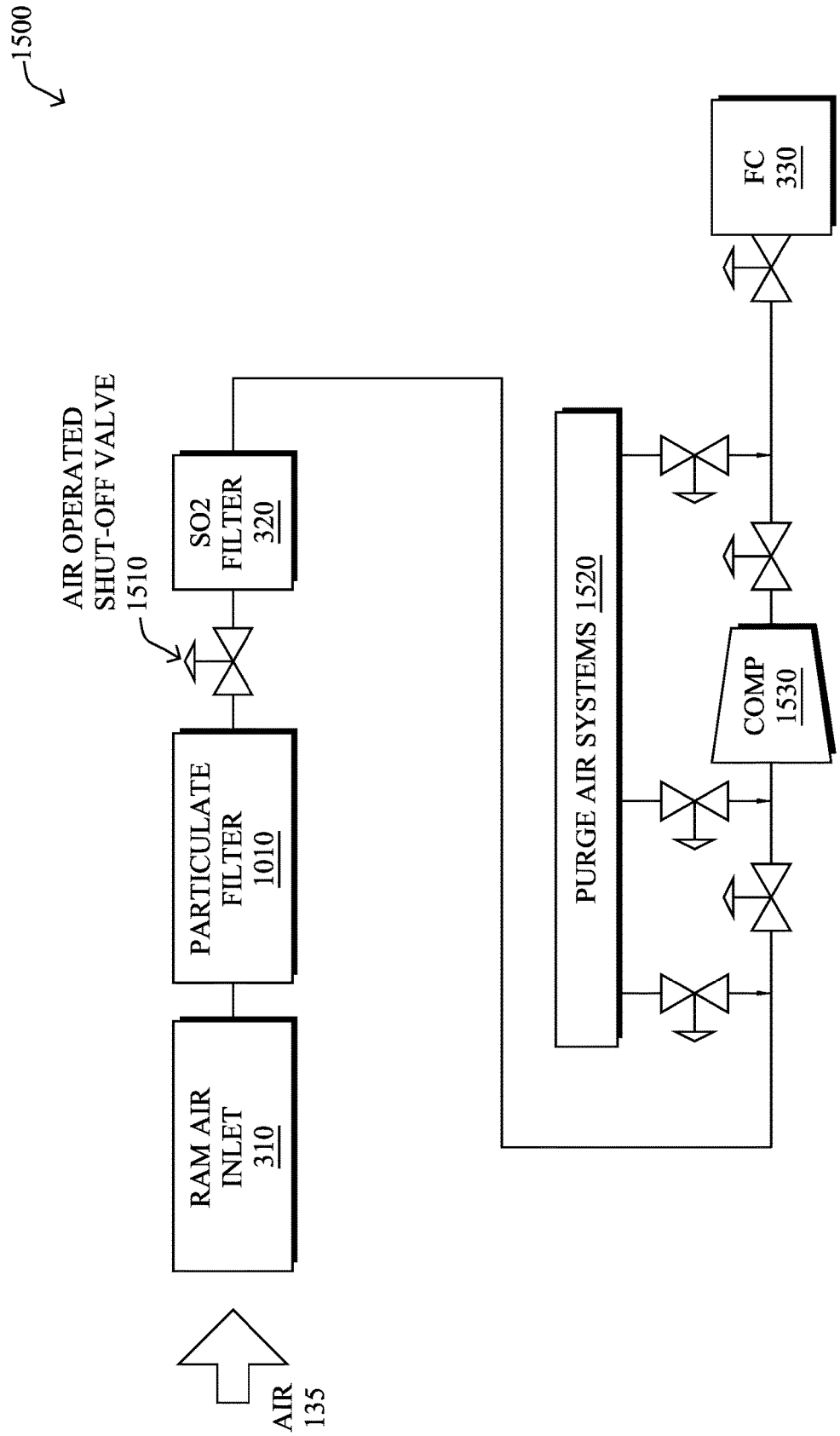
FIG. 15 illustrates an example of an airflow control system for fuel cell air filtration systems.

As an example, FIG. 15 illustrates an airflow control system 1500 for fuel cell air filtration systems, where air 135 passes through the inlet 310 and particulate filter 1010, and then through a series of shut-off valves 1510 (e.g., air operated or otherwise) and compensators 1530 between the air filter 320 and the fuel cell 330. Also, an illustrative purge air system 1520 is shown, which may be used as the alternate air supply mentioned above, or merely to clear out the airflow path with clean air after contamination is detected (e.g., prior to a fuel cell restart). Through operation of the one or more shut-off valves 1510, the fuel cell's air supply may be cut off, protecting the fuel cell from further (if any) contamination from detected dangerous gases.

Figure 16:
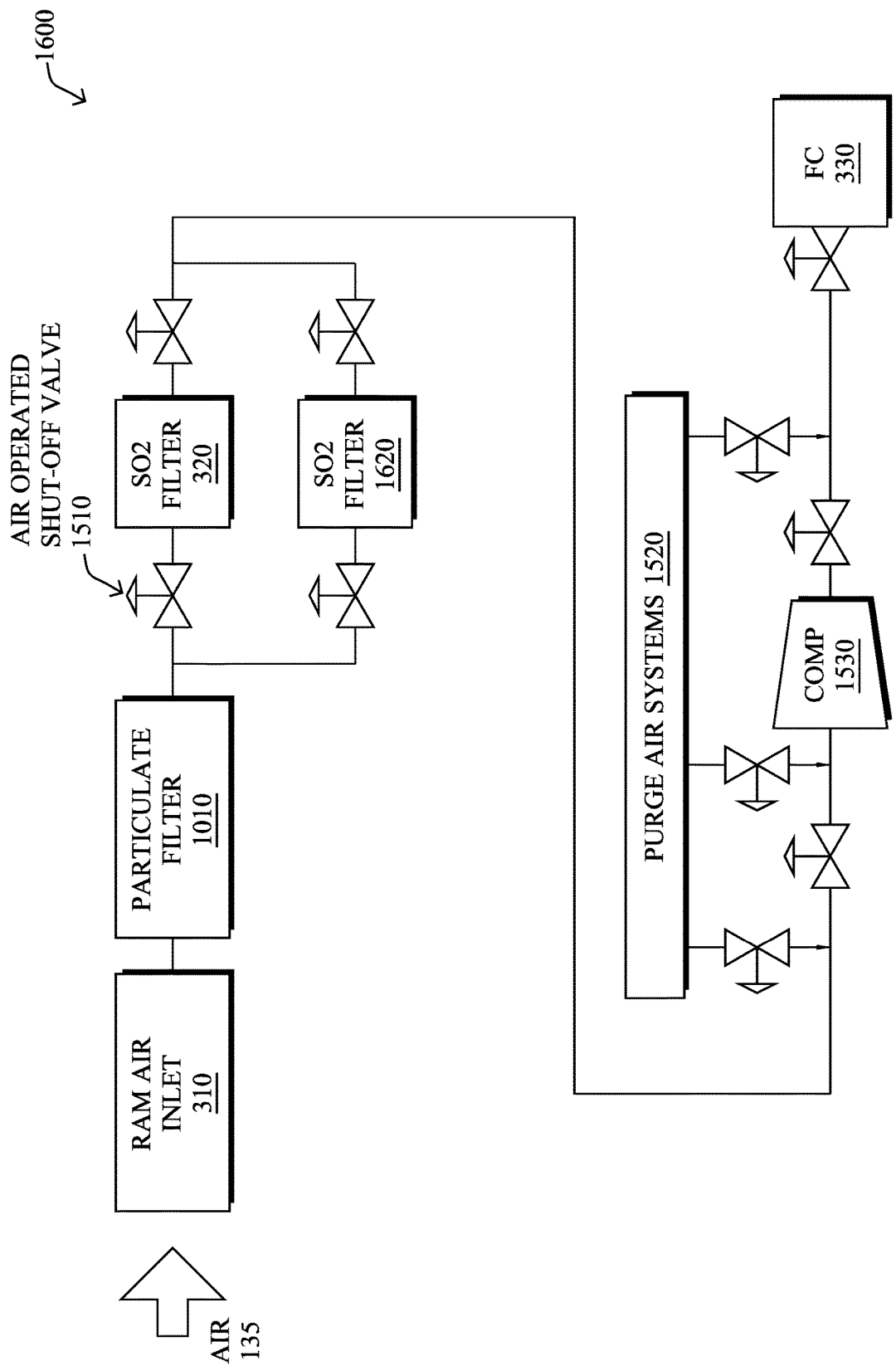
FIG. 16 illustrates another example of an airflow control system for fuel cell air filtration systems with active and standby filters.

FIG. 16 illustrates another example of an airflow control system 1600 for fuel cell air filtration systems, where the active filter 320 has a standby filter 1620 on hand for breakthrough or lifetime expiration of the active filter. For instance, by operating the shut-off valves 1510 in the proper manner, the environmental sensor array 360 can reroute the airflow through the standby filter 1620, giving uninterrupted service to the fuel cell 330 until the active filter 320 can be replaced. Said differently, the techniques herein may switch the airflow through a standby air filter to the fuel cell in response to the instantaneous level of any particular air contaminant of the post-filter air contaminants being above a respective threshold level. (Alternatively, mechanisms may be in place to move the backup filter into the airflow, rather than moving the airflow to the backup filter.) Notably, in the case of backup filters, once the standby filter 1620 is in operation, if the lifetime expires or breakthrough occurs on the standby filter, then the fuel cell may simply be shut down until filter maintenance can be performed.

Figure 17:
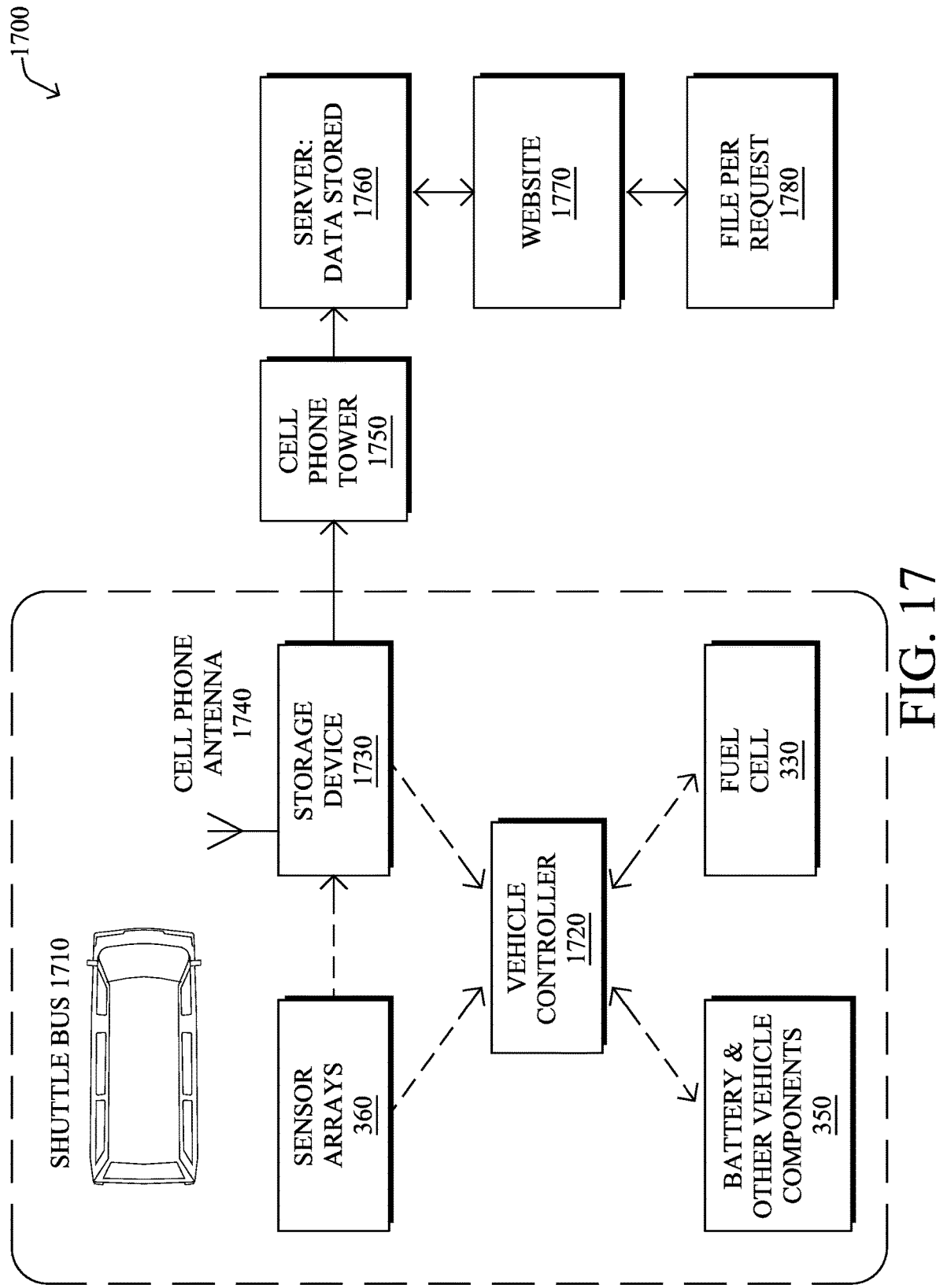
FIG. 17 illustrates an example vehicular communication environment for an environmental sensor array for fuel cell air filtration systems.

According to an illustrative embodiment of the techniques herein, the fuel cell system herein may be specifically configured for operation within a vehicle (e.g., a fuel cell electric bus). FIG. 17 illustrates an example vehicular communication environment 1700 within which the environmental sensor array 360 for fuel cell air filtration systems may be used to monitor and report environmental conditions, air filtration performance, and fuel cell system performance, as well as to control the operation of the fuel cell protection mechanisms mentioned above. For example, a vehicle (e.g., shuttle bus) 1710 may have one or more sensor arrays 360 communicating with a vehicle controller 1720 via a vehicle communication protocol (e.g., broadcasting the data over a controller area network (CAN) data line). The vehicle controller 1720 may also communicate with the fuel cell 330 and the battery (or other components) 350 over the CAN line, such that control operations between the environmental sensor array(s) 360 and the vehicle controller 1720 may coordinate to perform the functions described within the present disclosure.

In addition, a storage device 1730 may be configured to communicate with the environmental sensor array 360 and/or the vehicle controller 1720 to save collected data and to transmit the data remotely, e.g., via cell phone service or other wireless communication (antenna 1740), to a remote server 1760 (e.g., via cell phone towers or other services 1750), accessible then through a website 1770 and/or data files 1780 per user request. In this manner, the data from the vehicle may be retrievable for analysis by different users. Notably, depending on some preset levels for different gases, the storage device 1730 may be configured to adjust from a default logging rate to a fast rate (e.g., every 2 s) automatically. The storage device may be configured to log and report any number of available data points, such as, e.g., fuel cell current, fuel cell voltage, fuel cell coolant outlet temperature, fuel cell state of operation, fuel cell faults, fuel cell alarms, fuel cell system fan pulse width modulation (PWM), fuel cell system water pump control PWM, fuel cell system air flow, fuel cell system air flow required, fuel cell cathode stoichiometry, fuel cell run meter (total RUN time for fuel cell), energy produced by the fuel cell, fuel cell voltage min/max/average, fuel cell blower PWM, $H_2$ concentration from a leak sensor located next to the fuel cell, DC power provided to the fuel cell blower, high voltage battery state of charge (SoC), GPS information (position, speed, altitude), vehicle speed, electric drive motor DC current, DC-DC converter tied to the fuel cell output current, battery pack currents and voltages, SoC of accessory battery, $H_2$ tank pressure, and so on.

To transmit the data from the environmental sensor array 360 over the illustrative CAN data link, one or more CAN messages may be specifically configured to carry the necessary data. The same is true for the remaining data carried from the vehicle controller 1720 (e.g., to the storage device 1730). FIG. 18 illustrates an example messaging format 1800 for use with an environmental sensor array 360 for fuel cell air filtration systems, where three messages ("#1", "#2", and "#3") with eight bytes each (CAN byte 1810 "0-7") carry the data 1820 captured by the array.

Though any format of message may effectively be used herein, as an illustrative example of a formatting scheme for two-byte (16-bit) data values as shown in format 1800 of FIG. 18, message #1 may carry the $SO_2$ ppm least significant byte (LSB) (CAN byte 0) and most significant byte (MSB) (CAN byte 1), the $H_2S$ ppm LSB and MSB (CAN bytes 2-3), the NO ppm LSB and MSB (CAN bytes 4-5), and $NO_2$ ppm LSB and MSB (CAN bytes 6-7). Message #2 may illustratively carry the VOC ppm LSB and MSB (CAN bytes 0-1), the RH ppm LSB and MSB (CAN bytes 2-3), the Temperature ppm LSB and MSB (CAN bytes 4-5), and Pressure ppm LSB and MSB (CAN bytes 6-7). Message #3 may then illustratively carry the flow rate (e.g., liters per minute, lpm) LSB and MSB (CAN bytes 0-1), an Alarm Register "1" (High) (CAN byte 2), an Alarm Register "2") (Low) (CAN byte 3), and additional Spare values which can be defined later (CAN bytes 4-7). Note that other fields, such as header fields, message identifiers, sequence numbers, sensor array identifiers, and so on, may also be included within the messages.

Figure 19:
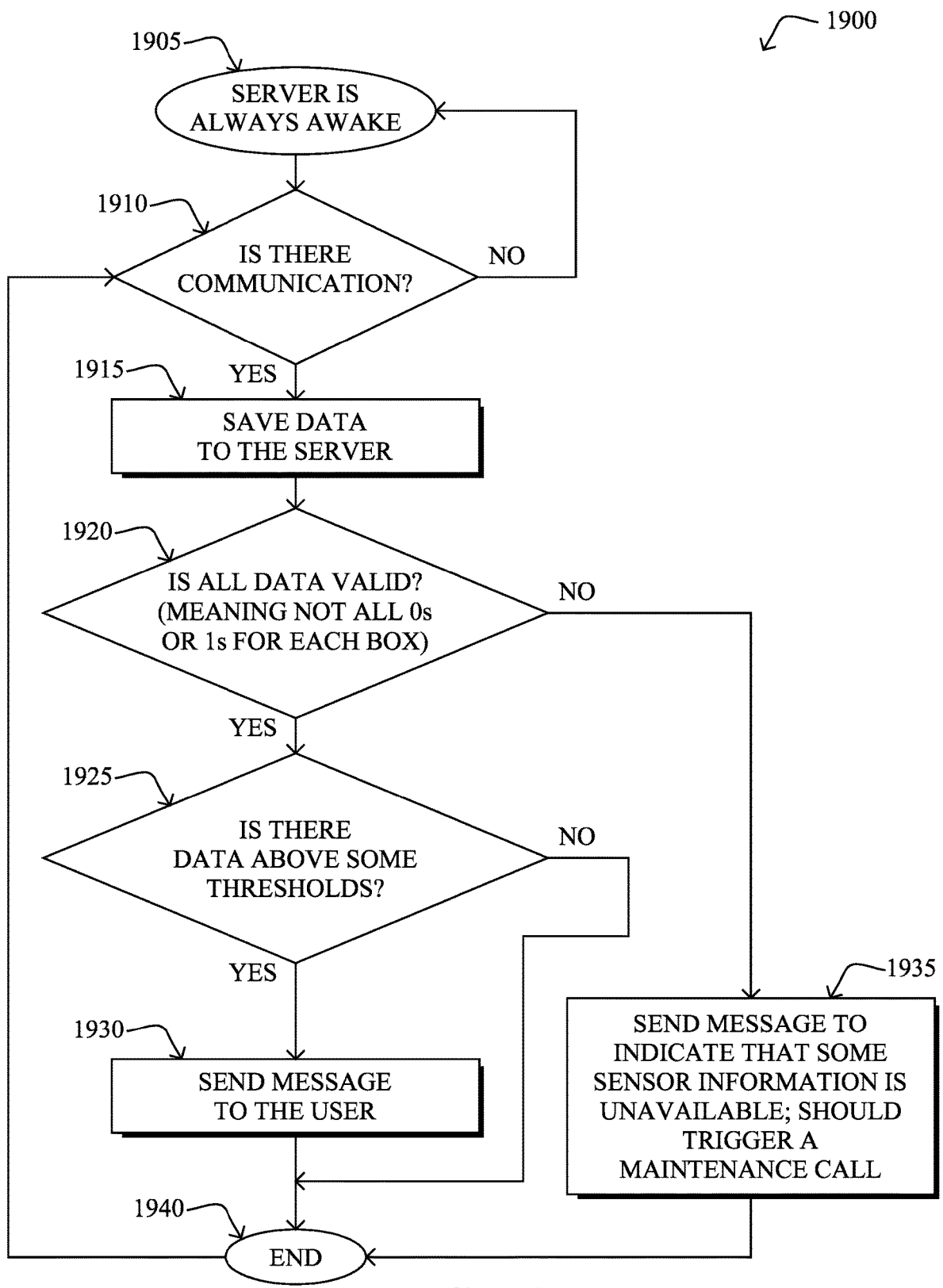
FIG. 19 illustrates an example simplified procedure for transmitting notifications regarding an environmental sensor array for fuel cell air filtration systems.

According to one or more embodiments herein, FIG. 19 illustrates an example simplified procedure 1900 for transmitting notifications regarding the environmental sensor array 360 for fuel cell air filtration systems. In particular, the remote server 1760 (or, depending on configuration and communication capability, any of the environmental sensor array 360, vehicle controller 1720, and/or storage device 1730) may be configured to send specific messages in response to specific events herein. For instance, assuming that the server is always operational in step 1905 to receive communication, then once there is a received communication in step 1910, the data is saved (1915) and checked to confirm that the data is valid (1920), such as by checking for all 0's or all 1's, or other mechanism to detect false or erroneous data. Valid data is then checked in step 1925 to determine whether any of the data is above a corresponding threshold, where if so, then in step 1930 a message may be sent to a user (e.g., an alarm condition). If the data was not valid in step 1920, then a different message may be sent to the user indicating the unavailable or erroneous sensor data, triggering a maintenance call to the fuel cell system. The procedure 1900 ends in step 1940, notably with the ability to continue receiving and interpreting data at the server.

Figure 20:
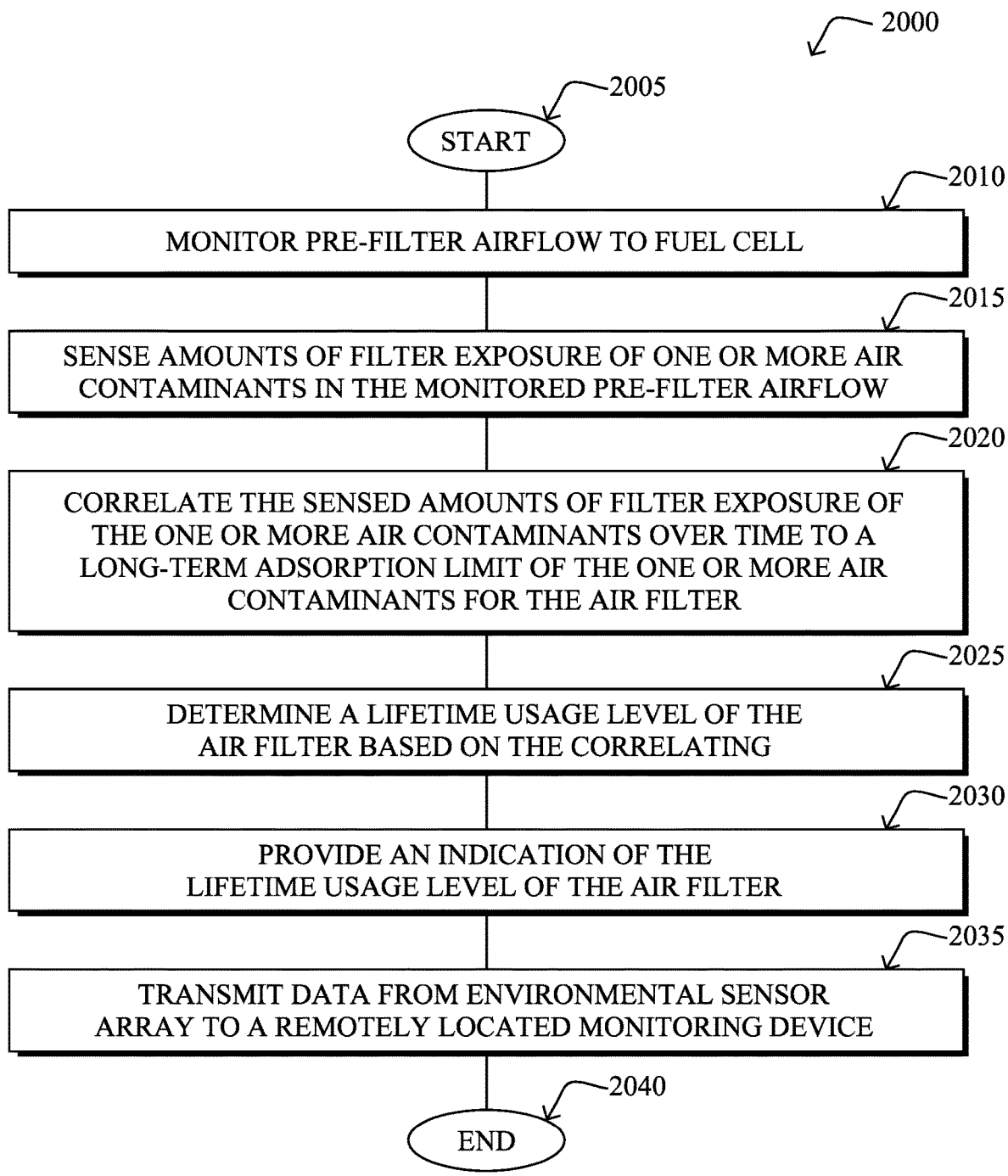
FIG. 20 illustrates an example simplified procedure for operating an environmental sensor array for fuel cell air filtration systems, particularly regarding long-term filter exposure to air contaminants.

To reiterate, generally, the techniques described above, FIG. 20 illustrates an example simplified procedure for operating an environmental sensor array for fuel cell air filtration systems in accordance with one or more embodiments described herein, particularly regarding long-term filter exposure to air contaminants. For example, a non-generic, specifically configured device (e.g., the environmental sensor array 360) may perform procedure 2000 by executing stored instructions (e.g., a process stored in memory or as configuration of a microprocessor).

The procedure 2000 may start at step 2005, and continues to step 2010, where, as described in greater detail above, the environmental sensor array 360 monitors pre-filter airflow 135(1) to a fuel cell 330 with an air filter 320, such that one or more sensors 1210 of the environmental sensor array can sense amounts of filter exposure of one or more air contaminants in the monitored pre-filter airflow in step 2015. As mentioned above, the one or more air contaminants sensed can be any combination of sulfur dioxide ($SO_2$), hydrogen sulfide ($H_2S$), nitrogen dioxide ($NO_2$), nitric oxide (NO), hydrogen fluoride (HF), volatile organic compounds (VOC), other sulfur-based contaminants, carbon dioxide ($CO_2$), hydrogen chloride (HCl), sulfuric acid ($H_2SO_4$), benzene, selenium, mercury, arsenic, iridium, and so on.

In step 2020, the environmental sensor array correlates the sensed amounts of filter exposure of the one or more air contaminants over time to a long-term adsorption limit of the one or more air contaminants for the air filter. For instance, as noted above, the long-term adsorption limit may be based on a predictive performance model (e.g., based on experimental determinations), and may be specifically based on the flow rate of the air flow. Additionally, in one or more embodiments, the environmental sensor array may also sense one or more additional attributes, such as temperature, atmospheric pressure, relative humidity, fuel cell performance, and so on, such that the long-term adsorption limit of the one or more air contaminants for the air filter may be further based on at least one of these additional attributes.

In step 2025, the environmental sensor array may determine a lifetime usage level of the air filter based on the correlating, and provides an indication of the lifetime usage level of the air filter in step 2030. For instance, as detailed above, the indication of the lifetime usage level of the air filter may be any configured indication, such as a requirement to change the air filter, a usage time remaining before changing the air filter, a lifetime usage percentage of the air filter, a lifetime remaining percentage of the air filter, and so on. Also, in step 2035, data may be transmitted from the environmental sensor array to a remotely located monitoring device, such as to notify the remote device of any problems, or simply to relay the monitored and sensed information to the remote device for reporting and/or further analysis.

The procedure 2000 illustratively ends in step 2040, however it should be noted that the procedure may continue to monitor and sense, and to make correlations and determinations in order to provide indications. Accordingly, the order and termination of the steps shown in procedure 2000 are merely an example, and are not meant to limit the scope of the embodiments herein.

Figure 21:
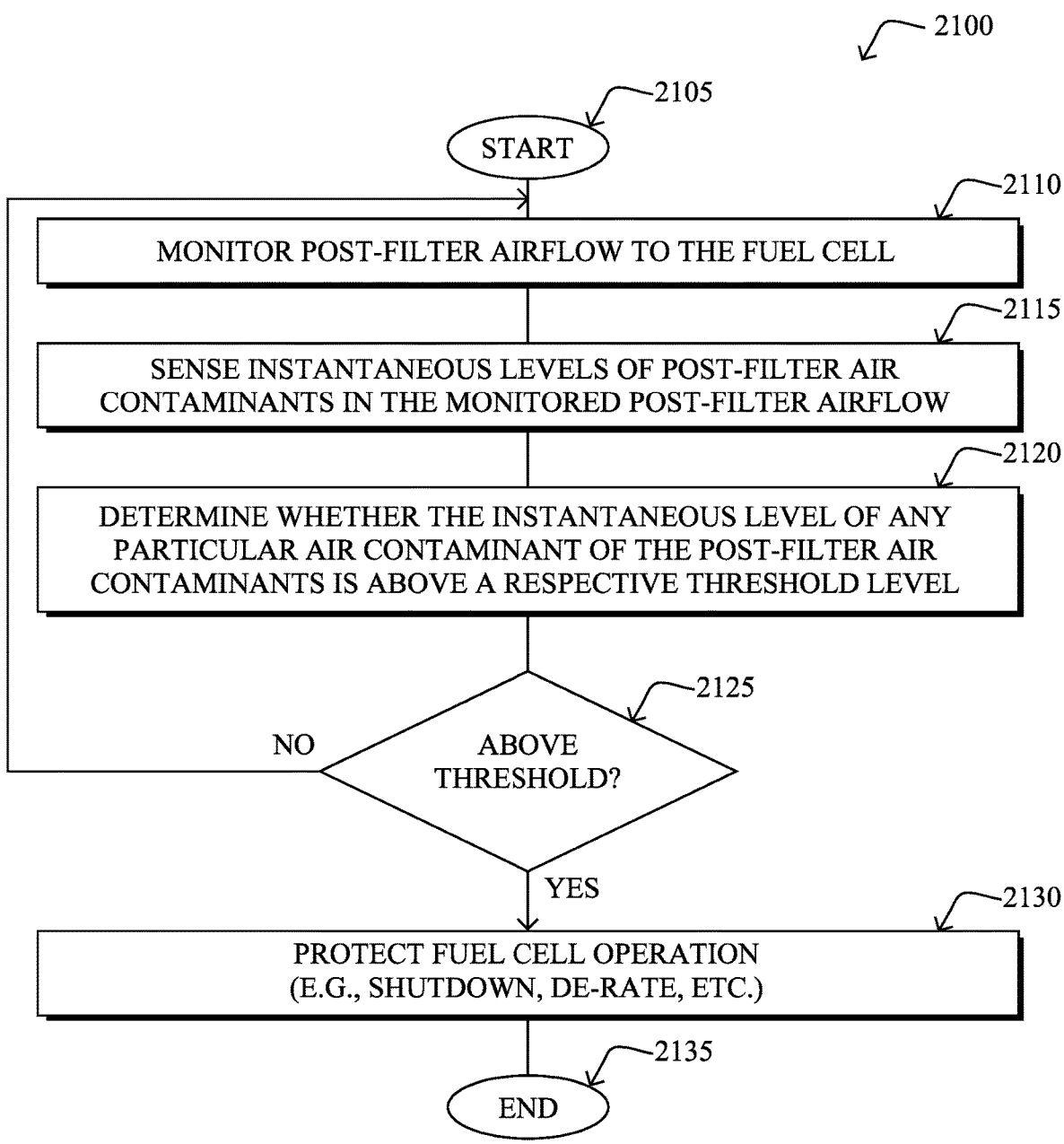
FIG. 21 illustrates another example simplified procedure for operating an environmental sensor array for fuel cell air filtration systems, particularly regarding instantaneous fuel cell exposure to air contaminants.

Additionally, FIG. 21 illustrates another example simplified procedure for operating an environmental sensor array for fuel cell air filtration systems in accordance with one or more embodiments described herein, particularly regarding instantaneous fuel cell exposure to air contaminants. For example, a non-generic, specifically configured device (e.g., the environmental sensor array 360) may perform procedure 2100 by executing stored instructions (e.g., a process stored in memory or as configuration of a microprocessor). Illustratively, the procedure 2100 may operate simultaneously to procedure 2000 of FIG. 20 above (e.g., to determine and react to filter breakthrough), though in one or more embodiments may also be a separate stand-alone procedure (e.g., as a fuel cell protection scheme, regardless of filter usage levels).

The procedure 2100 may start at step 2105, and continues to step 2110, where, as described in greater detail above, the environmental sensor array 360 (e.g., the same as procedure 2000 above or a separate array specific to procedure 2100) monitors post-filter airflow 135(2) to the fuel cell 330, and senses instantaneous levels of post-filter air contaminants in the monitored post-filter airflow in step 2115. Accordingly, in step 2120, the environmental sensor array can determine whether the instantaneous level of any particular air contaminant of the post-filter air contaminants is above a respective threshold level.

Once the decision is made in step 2125 that the instantaneous level of any particular air contaminant of the post-filter air contaminants is above the respective threshold level, then in step 2130 the environmental sensor array may protect fuel cell operation. For instance, according to the various embodiments as detailed above, the environmental sensor array may shut down the fuel cell, switch to an alternate power supply (e.g., battery 350), de-rate the fuel cell, switch the airflow through a standby air filter 1620 to the fuel cell, switch to an alternate air supply, and so on. Notably, as also mentioned above, the fuel cell may be restarted (or brought back to a higher power level) in response to the instantaneous level of any particular air contaminant of the post-filter air contaminants being below a respective restart threshold level.

The procedure 2100 may then illustratively end in step 2135, though notably with the option to continue monitoring, sensing, and protecting the fuel cell based on the instantaneous fuel cell exposure to air contaminants, accordingly.

It should be further noted that while certain steps within procedures 400, 600, 1900, 2000, and 2100 may be optional as described above, the steps shown in FIGS. 4, 6, 19, 20, and 21 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400, 600, 1900, 2000, and 2100 are described separately, certain steps from each procedure may be incorporated into each other procedure, and the procedures are not meant to be mutually exclusive.

The techniques described herein, therefore, provide for an environmental sensor array for fuel cell air filtration systems. In particular, the present disclosure has detailed a custom environmental sensor array that may be integrated into fuel cell systems (e.g., fuel cell vehicles, fuel cell electric buses, etc.) to monitor the surrounding environment and prolong fuel cell life, which is beneficial in many different fuel cell applications, especially where there is air contamination that needs monitoring. The techniques herein notably alleviate the problems associated with replacing air filters after a set period of time, where the filter is either underutilized (wasting money) or over-utilized, allowing contaminants to enter the fuel cell, thus causing permanent damage to the fuel cell. Accordingly, the air contaminant mitigation techniques and protocols herein allow for fuel cell vehicles or other fuel cell devices to operate in harsh environmental conditions (e.g., the example Hawai'i Volcanoes National Park mentioned above), based on various studies and the development of an understanding of air contaminant impacts on fuel cell performance and durability.

Specifically, as described above, the environmental sensor array herein may be integrated with a high-performance air filtration media to prevent fuel cell stack poisoning. The integrated system delivers real-time air contaminant concentrations (e.g., $SO_2$, $H_2S$, NO, $NO_2$, VOC, HF, etc.) in the environment from which air is drawn for the cathode (e.g., at the inlet of a blower and at the cathode inlet, after the air filter). The measurements taken with the sensor array can be used to predict air filter lifetimes (e.g., based on knowledge gained through laboratory air filtration experiments). The environmental sensor array herein may also be used to protect the stack from poisoning by automatically turning off the fuel cell when the air contamination is detected after the air filter at the entrance of the cathode (e.g., switching to battery power or otherwise, as mentioned above).

While there have been shown and described illustrative embodiments that provide for an environmental sensor array for fuel cell air filtration systems, it is to be understood that various other adaptations and modifications may be made within the spirit and scope of the embodiments herein. For example, while certain embodiments are described herein with respect to vehicular configuration, vehicle-based fuel cells are merely one example embodiment, and the techniques herein are equally applicable to stationary fuel cells. In addition, while certain types of fuel cells (e.g., hydrogen, PEM, etc.) are shown and described, any fuel cell that receives a filtered airflow may benefit from the techniques herein (e.g., direct methanol fuel cells (DMFC), etc.), whether large-scale or small-scale, single-cell or stacked-cell, and so on. Moreover, while certain air contaminants are shown (e.g., sulfur-based contaminants, etc.), any contaminant that may be harmful to a fuel cell's operation may be monitored and used to adjust operation of the fuel cell, and particularly to determine filter maintenance in filtered applications. (That is, certain contaminants may be monitored, but not necessarily filtered, in order to determine fuel cell life, fuel cell operation/de-rating/shutdown, and so on.) For instance, the environmental sensor array herein may be configured to sense for any air contaminant, not just those listed above, simply by swapping out the electrochemical sensors for those that sense the air contaminants for a given application.

Illustratively, the techniques described herein may be performed by hardware, software, and/or firmware, and any combination thereof. In particular, the environmental sensor array 360, or any other computing device shown and described above, may be configured to execute one or more processes that may include computer executable instructions executed by a processor to perform functions relating to the techniques described herein. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof.

Figure 22:
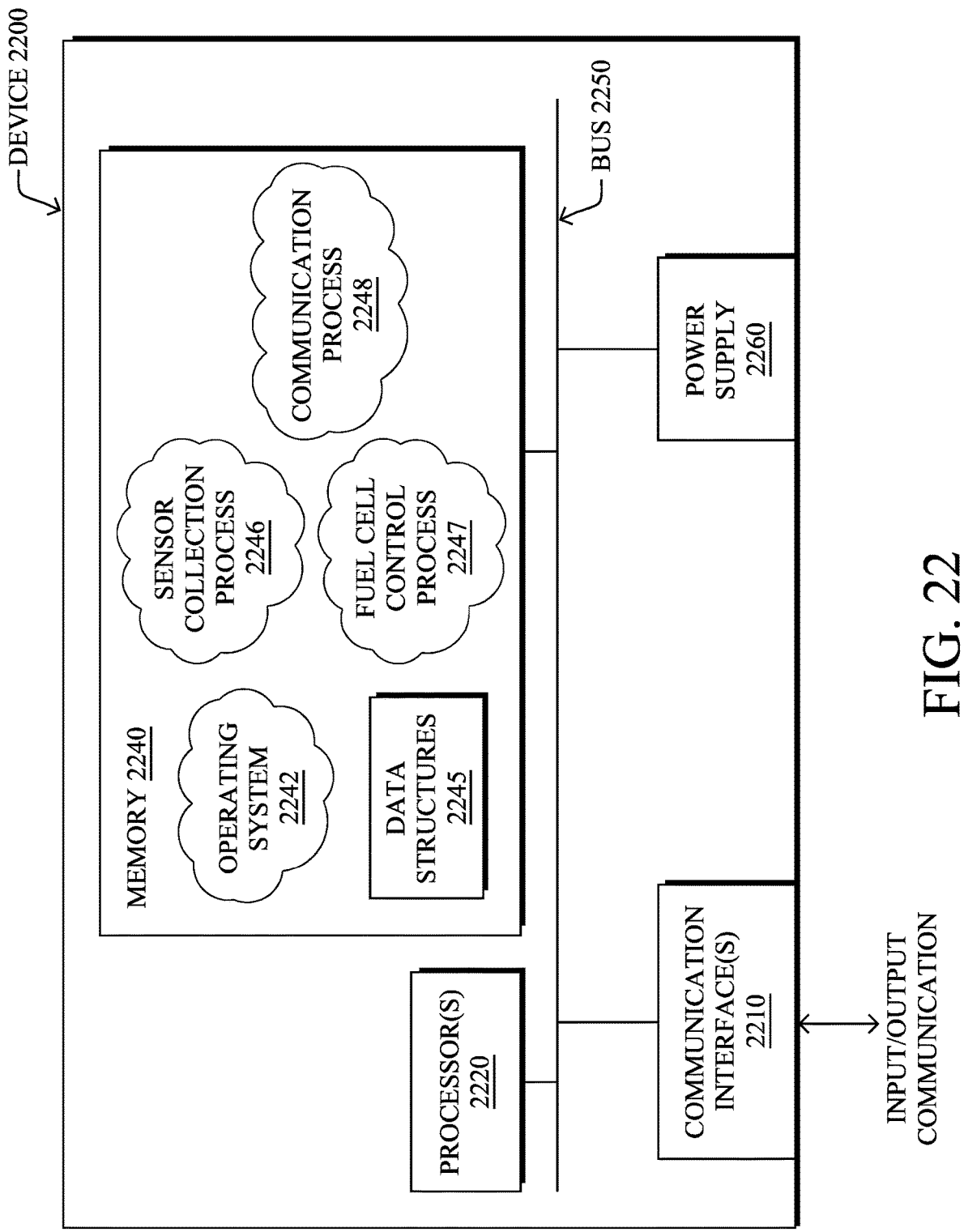
FIG. 22 illustrates an example computing device for use with an environmental sensor array for fuel cell air filtration systems.

As an example, FIG. 22 is a schematic block diagram of an example node/device 2200 that may be used with one or more embodiments described herein, e.g., as any of the computing devices shown above, particularly the environmental sensor array 360, or any other computing and/or communication device that supports the operations of the techniques herein. The simplified device 2200 comprises one or more communication interfaces 2210, one or more processors 2220, and a memory 2240 interconnected by a system bus 2250, and is powered by a power supply 2260.

The communication interfaces 2210 include the mechanical, electrical, and signaling circuitry for communicating data over ports (wired or wireless), such as CAN, RS-232, RS-485, cellular, and so on. The communication interfaces may be configured to transmit and/or receive data using a variety of different communication protocols.

The memory 2240 comprises a plurality of storage locations that are addressable by the processor(s) 2220 for storing software programs and data structures associated with the embodiments described herein. The processor 2220 may comprise necessary elements or logic adapted to execute the software programs and manipulate the data structures 2245. An operating system 2242, portions of which are typically resident in memory 2240 and executed by the processor(s), functionally organizes the device by, among other things, invoking operations in support of software processors and/or services executing on the device. These software processors and/or services may comprise a sensor collection process 2246, a fuel cell control process 2247, a communication process 2248, and so on.

It will be apparent to those skilled in the art that other processor and memory types, including various computer-readable media, may be used to store and execute program instructions pertaining to the techniques described herein (e.g., microprocessors, EEPROMs, etc.). Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes (e.g., a single "environmental sensor array" process configured to perform the techniques described above).

The foregoing description has been directed to specific embodiments. It will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
monitoring, by an environmental sensor array, both a pre-filter airflow to an air filter and a post-filter airflow to a fuel cell, wherein the air filter is between an air intake and the fuel cell;
sensing, by the environmental sensor array, amounts of filter exposure of one or more air contaminants in the monitored pre-filter airflow;
correlating, by the environmental sensor array, the sensed amounts of filter exposure of the one or more air contaminants over time to a long-term adsorption limit of the one or more air contaminants for the air filter;
determining, by the environmental sensor array, a lifetime usage level of the air filter based on the correlating;
providing, by the environmental sensor array, an indication of the lifetime usage level of the air filter;
sensing instantaneous level of post-filter air contaminants in the monitored post-filter airflow;
determining whether the instantaneous level of any particular air contaminant of the post-filter air contaminants is above a respective threshold level; and
switching, by an air flow control system, the pre-filter airflow to pass through a standby air filter in an alternative airflow path to the fuel cell in response to the instantaneous level of any particular air contaminant of the post-filter air contaminants being above the respective threshold level.

2. The method as in claim 1, wherein the indication of the lifetime usage level of the air filter is selected from a group consisting of: a requirement to change the air filter; a usage time remaining before changing the air filter; a lifetime usage percentage of the air filter; and a lifetime remaining percentage of the air filter.

3. The method as in claim 1, wherein the long-term adsorption limit of the one or more air contaminants for the air filter is based on a predictive performance model.

4. The method as in claim 1, further comprising:
sensing one or more additional attributes selected from a group consisting of: temperature; atmospheric pressure; relative humidity; and fuel cell performance;
wherein the long-term adsorption limit of the one or more air contaminants for the air filter is further based on at least one of the one or more additional attributes.

5. The method as in claim 1, further comprising:
transmitting data from the environmental sensor array to a remotely located monitoring device.

6. The method as in claim 1, wherein the one or more air contaminants are selected from a group consisting of: sulfur dioxide ($SO_2$); hydrogen sulfide ($H_2S$); nitrogen dioxide ($NO_2$); nitric oxide (NO), hydrogen fluoride (HF); and volatile organic compounds (VOC).

7. The method as in claim 1, wherein the fuel cell is a hydrogen fuel cell.

8. The method as in claim 1, wherein the fuel cell powers a vehicle.

* * * * *